(12) United States Patent
Tabata et al.

(10) Patent No.: US 11,618,311 B2
(45) Date of Patent: Apr. 4, 2023

(54) VEHICLE DRIVE DEVICE

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Koji Takaira, Okazaki (JP); Yuki Makino, Aichi-gun (JP); Akinori Homan, Toyota (JP); Yosuke Akiyama, Susono (JP); Akira Ijichi, Odawara (JP); Kunihiko Usui, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/680,944

(22) Filed: Feb. 25, 2022

(65) Prior Publication Data
US 2022/0274478 A1 Sep. 1, 2022

(30) Foreign Application Priority Data
Mar. 1, 2021 (JP) .............................. JP2021-032003

(51) Int. Cl.
*B60K 6/365* (2007.10)
*B60K 6/52* (2007.10)
(Continued)

(52) U.S. Cl.
CPC ............... *B60K 6/52* (2013.01); *B60K 6/365* (2013.01); *B60K 17/346* (2013.01);
(Continued)

(58) Field of Classification Search
CPC ........ B60K 6/52; B60K 6/365; B60K 17/364; B60K 17/342; B60K 17/356; F16H 48/22; F16H 48/32; F16H 61/12; B60Y 2200/92
See application file for complete search history.

(56) References Cited

U.S. PATENT DOCUMENTS 4,058,027 A * 11/1977 Webb ...................... F16H 48/26
475/85
4,893,881 A * 1/1990 Farr ........................... B60T 8/58
303/113.5

(Continued)

FOREIGN PATENT DOCUMENTS

| GB | 2190049 A | * 11/1987 | ........... B60K 17/348 |
| WO | 2010/141682 A1 | 12/2010 | |
| WO | WO-2015036823 A1 | * 3/2015 | ............ B60W 10/02 |

*Primary Examiner* — Tinh Dang
(74) *Attorney, Agent, or Firm* — Oliff PLC

(57) ABSTRACT

A vehicle drive device includes: a brake that is provided with a plurality of friction plates, a first piston and a second piston, and a first piston hydraulic chamber and a second piston hydraulic chamber, and selectively fixes the third rotating element to a fixing member; a hydraulic control circuit that controls supply of the hydraulic pressure to the first piston hydraulic chamber and the second piston hydraulic chamber; and a control device. The control device controls the hydraulic control circuit such that the hydraulic pressure is supplied to the first piston hydraulic chamber and the second piston hydraulic chamber when the first traveling mode is set, and controls the hydraulic control circuit such that the hydraulic pressure is supplied only to one of the first piston hydraulic chamber and the second piston hydraulic chamber when the second traveling mode is set.

7 Claims, 23 Drawing Sheets

(51) Int. Cl.
  *B60K 17/342*  (2006.01)
  *F16H 48/32*  (2012.01)
  *F16H 61/12*  (2010.01)
  *F16H 48/22*  (2006.01)
  *B60K 17/346*  (2006.01)
  *B60K 17/356*  (2006.01)

(52) U.S. Cl.
  CPC ........... *B60K 17/356* (2013.01); *F16H 48/22* (2013.01); *F16H 48/32* (2013.01); *F16H 61/12* (2013.01); *B60K 17/342* (2013.01); *B60Y 2200/92* (2013.01)

(56) References Cited

U.S. PATENT DOCUMENTS

| | | | | |
|---|---|---|---|---|
| 5,056,614 A | * | 10/1991 | Tokushima | B60K 23/0808 192/85.42 |
| 7,470,205 B2 | * | 12/2008 | Mae | B60K 6/40 475/116 |
| 10,208,836 B2 | * | 2/2019 | Murakami | F16H 3/663 |

* cited by examiner

|  | C1 | C2 | B1 | B2 | F1 |
|---|---|---|---|---|---|
| 1st | ○ |  |  | △ | ○ |
| 2nd | ○ |  | ○ |  |  |
| 3rd | ○ | ○ |  |  |  |
| 4th |  | ○ | ○ |  |  |
| R | ○ |  |  | ○ |  |

| DRIVE STATE | MODE | BF1 | CF1 | D1 | | D2 | |
|---|---|---|---|---|---|---|---|
| | | | | (1) | (2) | (1) | (2) |
| 1 | EV(FF)_Hi | | ○ | △ | | | |
| 2 | EV(FF)_Lo | ○ | | △ | | | |
| 3 | H4_TORQUE SPLIT | | | ○ | | ○ | |
| 4 | H4_LSD | | ○ CONTROL | ○ | | ○ | |
| 5 | H4_Lock | | | ○ | | | ○ |
| 6 | L4_Lock | ○ | | | | ○ | ○ |

| DRIVE STATE | MODE | BF1 | CF1 | D1 | | D2 | |
|---|---|---|---|---|---|---|---|
| | | | | (1) | (2) | (1) | (2) |
| 1 | EV(FR)_Hi | | ○ | △ | | | |
| 2 | EV(FR)_Lo | ○ | | △ | | | |
| 3 | H4_TORQUE SPLIT | | | ○ | | ○ | |
| 4 | H4_LSD | | ○ CONTROL | ○ | | ○ | |
| 5 | H4_Lock | | | ○ | | | ○ |
| 6 | L4_Lock | ○ | | | ○ | | ○ |

VEHICLE DRIVE DEVICE

CROSS-REFERENCE TO RELATED APPLICATION

This application claims priority to Japanese Patent Application No. 2021-032003 filed on Mar. 1, 2021, incorporated herein by reference in its entirety.

BACKGROUND

1. Technical Field

The present disclosure relates to a vehicle drive device.

2. Description of Related Art

WO 2010/141682 discloses a vehicle drive device including a first power source, a second power source, a first output shaft that is connected to the first power source and outputs power to one of front wheels and rear wheels, a second output shaft that outputs power to the other of the front wheels and the rear wheels, and a differential mechanism including a first rotating element, a second rotating element, and a third rotating element. The vehicle drive device is capable of realizing a first traveling mode in which a vehicle travels in a four-wheel drive state using at least the power output from the first power source, and a second traveling mode in which the vehicle travels in a two-wheel drive state using the power output from the second power source.

SUMMARY

In the vehicle drive device disclosed in WO 2010/141682, a brake that selectively fixes the third rotating element to a fixing member is provided. The third rotating element is provided as a reaction force element, the first rotating element is provided as an input element, and the second rotating element is provided as an output element. Then, in the first traveling mode, at least the power from the first power source is input to the first rotating element, and the third rotating element is fixed to the fixing member to decelerate the power input to the first rotating element and to output the power from the second rotating element to the first output shaft and the second output shaft. Further, in the second traveling mode, the power from the second power source is input to the first rotating element, and the third rotating element is fixed to the fixing member to decelerate the power input to the first rotating element and to output the power from the second rotating element to one of the first output shaft and the second output shaft. When the vehicle drive device is configured as described above, there is the following issue.

That is, the power input from the first drive source to the first rotating element is larger than the power input from the second drive source to the first rotating element, and in the first traveling mode, the brake needs to generate reaction torque that is larger than that in the second traveling mode. Here, when a hydraulic friction engaging device is used as the brake, the number of friction plates needs to match the large torque capacity required in the first traveling mode. However, there is an issue that, when the number of friction plates is large, the controllability of the friction engaging device deteriorates when the torque capacity required for engaging the friction engaging device is small, and as a result, a shock is generated when the friction plates are engaged to set the second traveling mode.

The present disclosure has been made in view of the above issue, and an object of the present disclosure is to provide a vehicle drive device capable of suppressing a shock when the second traveling mode is set.

In order to solve the above issue and achieve the object, a vehicle drive device according to the present disclosure includes: a first power source; a second power source; a first output shaft that is connected to the first power source and outputs power to one of front wheels and rear wheels; a second output shaft that outputs power to the other of the front wheels and the rear wheels; a differential mechanism provided with a first rotating element, a second rotating element, and a third rotating element; a control device; a brake that is provided with a plurality of friction plates, a first piston and a second piston that press the friction plates, and a first piston hydraulic chamber and a second piston hydraulic chamber for applying a hydraulic pressure to the first piston and the second piston, respectively, and selectively fixes the third rotating element to a fixing member; and a hydraulic control circuit that controls supply of the hydraulic pressure to the first piston hydraulic chamber and the second piston hydraulic chamber. A first traveling mode and a second traveling mode are configured to be settable, the first traveling mode being a mode in which at least the power from the first power source is input to the first rotating element and the third rotating element is fixed to the fixing member such that the power input to the first rotating element is decelerated and output from the second rotating element to the first output shaft and the second output shaft so as to cause a vehicle to travel in a four-wheel drive state, and the second traveling mode being a mode in which the power from the second power source is input to the first rotating element and the third rotating element is fixed to the fixing member such that the power input to the first rotating element is decelerated and output from the second rotating element to one of the first output shaft and the second output shaft so as to cause the vehicle to travel in a two-wheel drive state. The control device is configured to control the hydraulic control circuit such that the hydraulic pressure is supplied to the first piston hydraulic chamber and the second piston hydraulic chamber when the first traveling mode is set, and control the hydraulic control circuit such that the hydraulic pressure is supplied only to one of the first piston hydraulic chamber and the second piston hydraulic chamber when the second traveling mode is set.

With this configuration, in the vehicle drive device according to the present disclosure, it is possible to suppress a shock when the second traveling mode is set.

Further, in the above, the hydraulic control circuit may include a switching valve provided with a valve body of which position is switchable between a first position at which the hydraulic pressure is supplied to the first piston hydraulic chamber and the second piston hydraulic chamber and a second position at which the hydraulic pressure is supplied only to one of the first piston hydraulic chamber and the second piston hydraulic chamber, and an electromagnetic valve that switches the position of the valve body between the first position and the second position. The position of the valve body may be set to the first position when the electromagnetic valve is turned off.

With this configuration, when a failure that the electromagnetic valve is off occurs, the torque capacity of the brake can be adjusted to the torque capacity required in the first traveling mode.

Further, in the above, the control device may be configured to prohibit setting of the second traveling mode when a failure that the electromagnetic valve is off occurs.

With this configuration, it is possible to suppress the shock caused by setting the second traveling mode when the failure that the electromagnetic valve is off occurs.

Further, in the above, the control device may be configured to reduce the hydraulic pressure to be supplied to the first piston hydraulic chamber and the second piston hydraulic chamber for setting the second traveling mode when a failure that the electromagnetic valve is off occurs.

With this configuration, it is possible to suppress the shock caused by setting the second traveling mode when the failure that the electromagnetic valve is off occurs.

Further, in the above, the hydraulic control circuit may include a switching valve provided with a valve body of which position is switchable between a first position at which the hydraulic pressure is supplied to the first piston hydraulic chamber and the second piston hydraulic chamber and a second position at which the hydraulic pressure is supplied only to one of the first piston hydraulic chamber and the second piston hydraulic chamber, and an electromagnetic valve that switches a position of the valve body between the first position and the second position. The position of the valve body may be set to the second position when the electromagnetic valve is turned off.

With this configuration, when a failure that the electromagnetic valve is off occurs, the torque capacity of the brake can be adjusted to the torque capacity required in the second traveling mode.

Further, in the above, the control device may be configured to prohibit setting of the first traveling mode when a failure that the electromagnetic valve is off occurs.

With this configuration, it is possible to suppress deterioration of durability of the friction plates caused by setting the first traveling mode when the failure that the electromagnetic valve is off occurs.

Further, in the above, the control device may reduce torque output from the first power source for causing a vehicle to travel in the first traveling mode when a failure that the electromagnetic valve is off occurs.

With this configuration, it is possible to suppress deterioration of durability of the friction plates caused by setting the first traveling mode when the failure that the electromagnetic valve is off occurs.

The vehicle drive device according to the present disclosure can achieve an effect that a shock when the second traveling mode is set can be suppressed.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 16 is a diagram showing a hydraulic control circuit in a state where an electromagnetic valve is on;

FIG. 19 is a diagram showing the hydraulic control circuit in a modification in a state where the electromagnetic valve is on;

DETAILED DESCRIPTION OF EMBODIMENTS

First Embodiment

A first embodiment of a vehicle drive device according to the present disclosure will be described below. Note that, an applicable embodiment of the present disclosure is not limited to the present embodiment.

Figure 1:
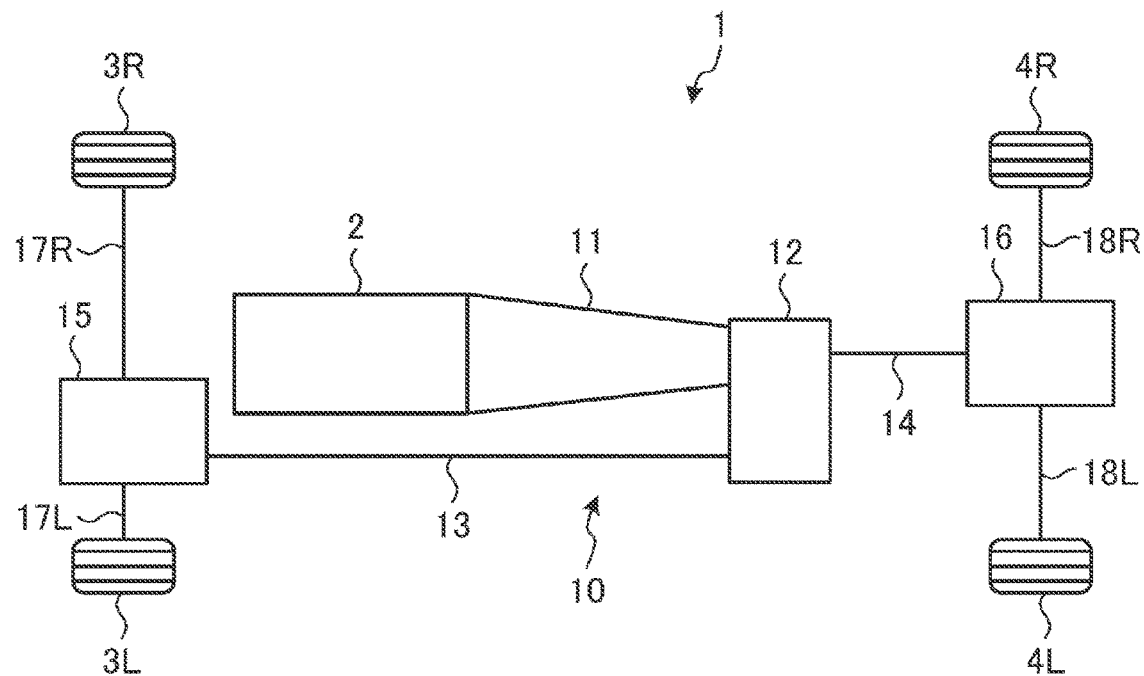
FIG. 1 is a diagram showing a schematic configuration of a vehicle provided with a drive device according to a first embodiment.

FIG. 1 is a diagram showing a schematic configuration of a vehicle 1 provided with a drive device 10 according to the first embodiment. The vehicle 1 includes right and left front wheels 3R, 3L, right and left rear wheels 4R, 4L, and the drive device 10 that transfers power from an engine 2 as a first power source to the right and left front wheels 3R, 3L and the right and left rear wheels 4R, 4L. This vehicle 1 is a four-wheel drive vehicle based on front-engine, rear-wheel-drive layout.

The drive device 10 includes the engine 2, a compound transmission 11 connected to the engine 2, a transfer 12 that is a front-rear wheel power distribution device connected to the compound transmission 11, and a front propeller shaft 13 and a rear propeller shaft 14 that are both connected to the transfer 12, a front-wheel differential gear mechanism 15 connected to the front propeller shaft 13, a rear-wheel differential gear mechanism 16 connected to the rear propeller shaft 14, right and left front wheel axles 17R, 17L connected to the front-wheel differential gear mechanism 15, right and left rear wheel axles 18R, 18L connected to the rear-wheel differential gear mechanism 16. Note that, when the right and left of the wheels and the wheel axles are not particularly differentiated from each other, reference signs R and L are omitted, and the terms are described as the front wheels 3, the rear wheels 4, the front wheel axles 17, and the rear wheel axles 18.

The engine 2 is a known internal combustion engine such as a gasoline engine or a diesel engine. In the engine 2, engine torque that is the output torque from the engine 2 is controlled by controlling an engine control device 101 such as a throttle actuator, a fuel injection device, and an ignition device provided in the engine 2 by an electronic control device 100 that will be described later.

The power output from the engine 2 is transferred to the transfer 12 via the compound transmission 11. Then, the power transferred to the transfer 12 is sequentially transferred from the transfer 12 to the rear wheels 4 via the rear propeller shaft 14, the rear-wheel differential gear mechanism 16, and the rear wheel axles 18 that constitute a power transfer path on the rear wheel side. A part of the power transferred to the transfer 12 is distributed to the front wheels 3 by the transfer 12, and is transferred to the front wheels 3 via the front propeller shaft 13, the front-wheel differential gear mechanism 15, and the front wheel axles 17 that constitute a power transfer path on the front wheel side. Unless otherwise specified, the power has the same meaning as the torque and the force.

Figure 2:
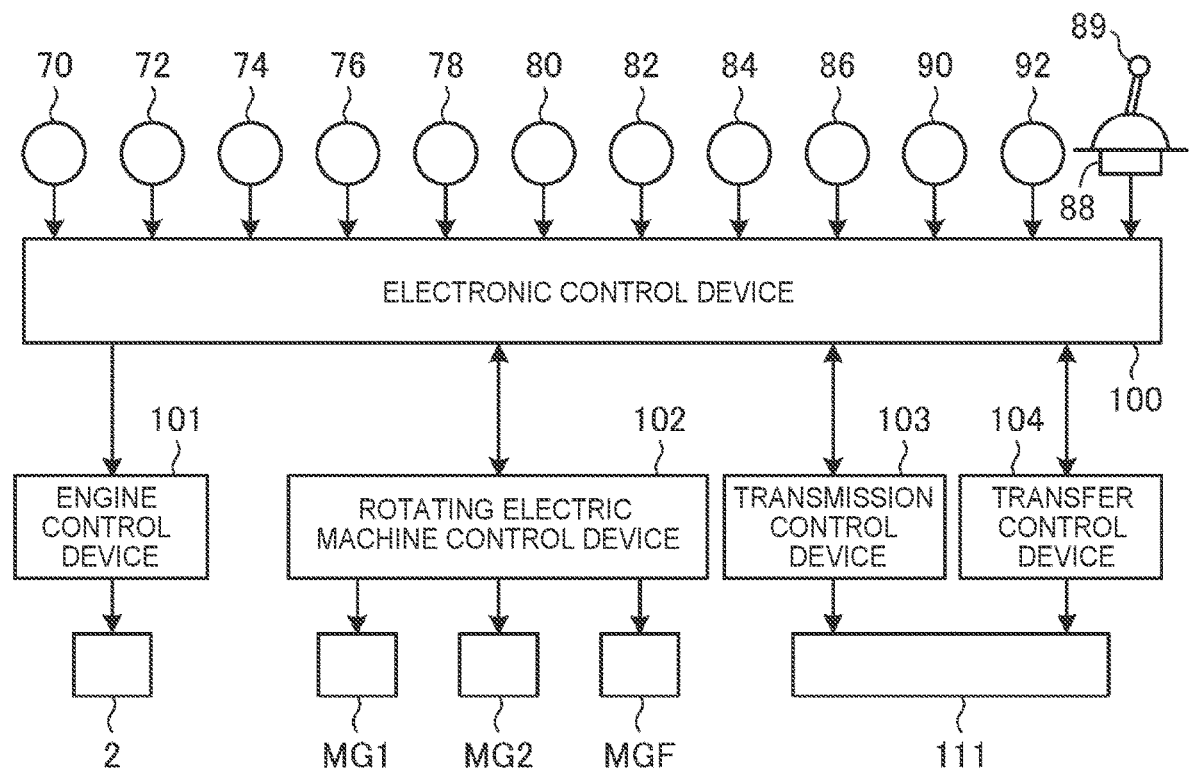
FIG. 2 is a diagram illustrating a main portion of a control system for various controls in the drive device according to the first embodiment.

As shown in FIG. 2, the drive device 10 includes the electronic control device 100. The electronic control device 100 includes, for example, a so-called microcomputer provided with a central processing unit (CPU), a random access memory (RAM), a read-only memory (R0M), and an input and output interface. The CPU executes various controls by executing signal processing in accordance with a program stored in the R0M in advance while using a transitory storage function of the RAM.

Output signals from various sensors and switches provided in the vehicle 1 (for example, an engine speed sensor 70, an output rotational speed sensor 72, an MG1 rotational speed sensor 74, an MG2 rotational speed sensor 76, an accelerator operation amount sensor 78, a throttle valve opening degree sensor 80, a battery sensor 82, an oil temperature sensor 84, a four-wheel-drive (4WD) selection switch 86, a shift position sensor 88 of a shift lever 89, a Low selection switch 90, and a Lock selection switch 92) and the like are input to the electronic control device 100. Further, the electronic control device 100 calculates a state-of-charge value S0C [%] as a value indicating a charge state of the battery based on, for example, charge and discharge current and a battery voltage of the battery that is a power storage device.

The electronic control device 100 outputs various command signals (for example, an engine control command signal for controlling the engine 2, a rotating electric machine control command signal for controlling a first rotating electric machine MG1, a second rotating electric machine MG2, and a third rotating electric machine MGF, and a hydraulic control command signal for controlling a hydraulic pressure of a hydraulic control circuit 111 that controls operating states of engaging devices of the compound transmission 11 and engaging devices of the transfer 12) to the respective devices provided in the drive device 10 (for example, the engine control device 101, a rotating electric machine control device 102, a transmission control device 103, and a transfer control device 104).

Figures 3, 4:
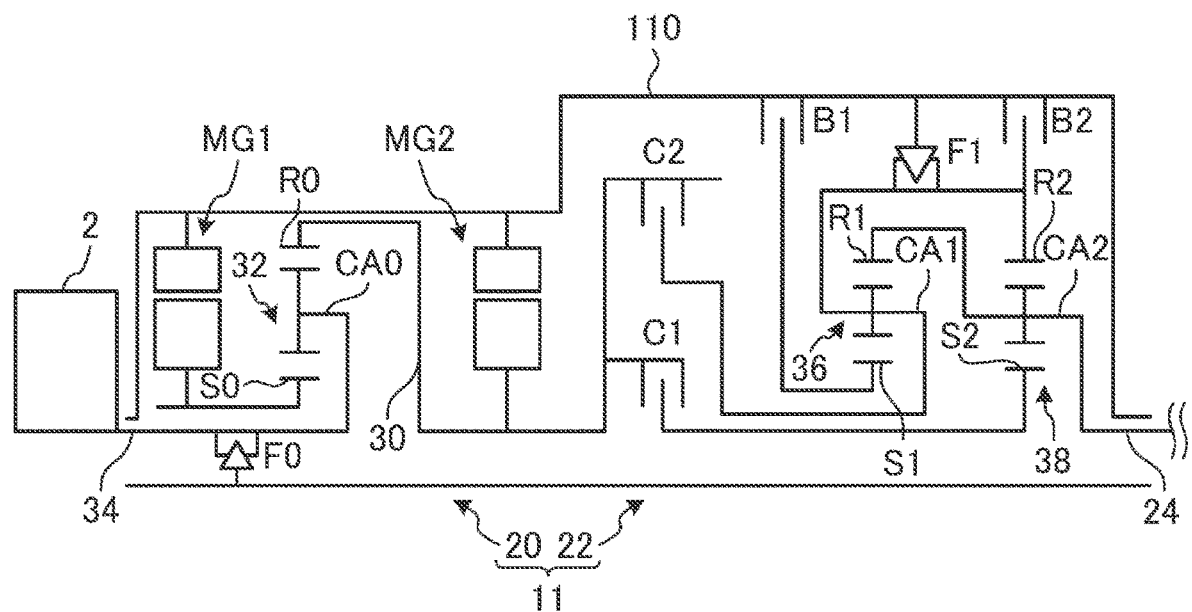
FIG. 3 is a diagram illustrating a schematic configuration of a compound transmission according to the first embodiment.
FIG. 4 is a diagram illustrating the relationship of the combination between the gear stage of a stepped transmission unit and the operation of an engaging device.

FIG. 3 is a diagram illustrating a schematic configuration of the compound transmission 11 according to the first embodiment. The first rotating electric machine MG1 and the second rotating electric machine MG2 are rotating electric machines having a function as a motor and a function as a generator, and are so-called motor generators. The first rotating electric machine MG1 and the second rotating electric machine MG2 function as a power source for traveling capable of generating drive torque. The first rotating electric machine MG1 and the second rotating electric machine MG2 are each connected to the battery (not shown) as a power storage device provided in the vehicle 1 via an inverter (not shown) provided in the vehicle 1. The rotating electric machine control device 102 controls the inverter so as to control MG1 torque and MG2 torque that are the output torques from the first rotating electric machine MG1 and the second rotating electric machine MG2, respectively. The output torque from the rotating electric machine is power running torque in the positive torque on the acceleration side and regenerative torque in the negative torque on the deceleration side. The battery is a power storage device that supplies and receives electric power to and from each of the first rotating electric machine MG1 and the second rotating electric machine MG2. Therefore, the vehicle 1 is a hybrid vehicle.

The compound transmission 11 is provided with a continuously variable transmission unit 20 that is an electric differential unit and a stepped transmission unit 22 that is a mechanical transmission. The continuously variable transmission unit 20 and the stepped transmission unit 22 are disposed in series on a common axis in a transmission case 110 as a non-rotating member attached to a vehicle body. The continuously variable transmission unit 20 is directly or indirectly connected to the engine 2 via a damper (not shown) or the like. The stepped transmission unit 22 is connected to the output side of the continuously variable transmission unit 20. Further, an output shaft 24 that is an output rotating member of the stepped transmission unit 22 is connected to the transfer 12. In the drive device 10, the power output from the engine 2 is transferred to the stepped transmission unit 22, and is transferred from the stepped transmission unit 22 to the drive wheels via the transfer 12 and the like. Further, the continuously variable transmission unit 20, the stepped transmission unit 22, and the like are configured substantially symmetrically with respect to the common axis, and the lower half of the axis is omitted in FIG. 1. The common axis above is the axis of the crankshaft of the engine 2, a connecting shaft 34, and the like.

The continuously variable transmission unit 20 is provided with the first rotating electric machine MG1 and a differential mechanism 32. The differential mechanism 32 is a power split mechanism that mechanically splits the power from the engine 2 to the first rotating electric machine MG1 and an intermediate transfer member 30 that is an output rotating member of the continuously variable transmission unit 20. The second rotating electric machine MG2 is connected to the intermediate transfer member 30 such that power can be transferred to the second rotating electric machine MG2. The continuously variable transmission unit 20 is an electric differential unit in which the differential state of the differential mechanism 32 is controlled by controlling the operating state of the first rotating electric machine MG1. The continuously variable transmission unit 20 is operated as an electric continuously variable transmission in which a gear ratio that is a value of the ratio of the engine speed to an MG2 rotational speed is variable. The engine speed has the same value as a rotational speed of the connecting shaft 34 serving as an input rotating member. The MG2 rotational speed is a rotational speed of the intermediate transfer member 30 serving as an output rotating member.

The differential mechanism 32 is configured by a single pinion type planetary gear device, and includes a sun gear S0, a carrier CA0, and a ring gear R0. The engine 2 is connected to the carrier CA0 via the connecting shaft 34 such that power can be transferred. The first rotating electric machine MG1 is connected to the sun gear S0 such that power can be transferred. The second rotating electric machine MG2 is connected to the ring gear R0 such that power can be transferred. In the differential mechanism 32, the carrier CA0 functions as an input element, the sun gear S0 functions as a reaction force element, and the ring gear R0 functions as an output element.

The stepped transmission unit 22 is a mechanical transmission unit serving as a stepped transmission constituting a part of a power transfer path between the intermediate transfer member 30 and the transfer 12, that is, a mechanical transmission unit constituting a part of the power transfer path between the continuously variable transmission unit 20 and the transfer 12. The intermediate transfer member 30 also functions as an input rotating member of the stepped transmission unit 22. The stepped transmission unit 22 is an automatic transmission (AT) of a known planetary gear type that includes, for example, a plurality of sets of planetary gear devices composed of a first planetary gear device 36 and a second planetary gear device 38, and a plurality of engaging devices of a clutch C1, a clutch C2, a brake B1, and a brake B2, including a one-way clutch F1. Hereinafter, the clutch C1, the clutch C2, the brake B1, and the brake B2 are simply referred to as an engaging device unless specifically distinguished.

The engaging device is a hydraulic friction engaging device configured by a multi-plate or single plate clutch or brake pressed by a hydraulic actuator, a band brake tightened by the hydraulic actuator, or the like. An operating state of the engaging device is switched between operating states such as engagement and disengagement by each of hydraulic pressures as adjusted predetermined hydraulic pressures output from the hydraulic control circuit 111 provided in the vehicle 1.

In the stepped transmission unit 22, the rotating elements of the first planetary gear device 36 and the second planetary gear device 38 are partially connected to each other or each connected to the intermediate transfer member 30, the transmission case 110, or the output shaft 24 directly or indirectly via the engaging device or the one-way clutch F1. Each rotating element of the first planetary gear device 36 includes a sun gear S1, a carrier CA1, and a ring gear R1, and each rotating element of the second planetary gear device 38 includes a sun gear S2, a carrier CA2, and a ring gear R2.

The stepped transmission unit 22 is a stepped transmission in which any of a plurality of shift stages (also referred to as gear stages) among the gear stages having gear ratios(=AT input rotational speed/output rotational speed) that differ depending on, for example, engagement of a predetermined engaging device that is any of the engaging devices. That is, in the stepped transmission unit 22, the gear stage is switched, that is, speed change is executed, by selectively engaging the engaging devices. The stepped transmission unit 22 is a stepped automatic transmission in which each of a plurality of gear stages is formed. In the first embodiment, the gear stage formed by the stepped transmission unit 22 is referred to as an AT gear stage. The AT input rotational speed is the input rotational speed of the stepped transmission unit 22 that is the rotational speed of the input rotating member of the stepped transmission unit 22, and has the same value as the rotational speed of the intermediate transfer member 30. Further, the AT input rotational speed has the same value as the MG2 rotational speed that is the rotational speed of the second rotating electric machine MG2. The AT input rotational speed can be expressed by the MG2 rotational speed. The output rotational speed is the rotational speed of the output shaft 24 that is the output rotational speed of the stepped transmission unit 22, and is also the output rotational speed of the compound transmission 11 that is the entire transmission in which the continuously variable transmission unit 20 and the stepped transmission unit 22 are combined. The compound transmission 11 is a transmission constituting a part of the power transfer path between the engine 2 and the transfer 12.

FIG. 4 is a diagram illustrating the relationship of the combination between the AT gear stage of the stepped transmission unit 22 and the operation of an engaging device CB. In FIG. 4, a white circle indicates engagement, a white triangle indicates engagement as needed, and blank indicates disengagement. As shown in FIG. 4, for example, the stepped transmission unit 22 has four forward AT gear stages from the AT first gear stage ("1st" in FIG. 4) to the AT fourth gear stage ("4th" in FIG. 4) and a reverse AT gear stage ("R" in FIG. 4), as a plurality of the AT gear stages. The gear ratio of the AT first gear stage is the largest, and the gear ratio becomes smaller as the AT gear stage is on the higher side.

In the stepped transmission unit 22, the electronic control device 100 selectively switches the AT gear stage formed in accordance with an operation of an accelerator pedal by a driver, a vehicle speed, or the like, that is, selectively forms the AT gear stages. For example, in shift control of the stepped transmission unit 22, the shifting is executed by switching engagement of any of the engaging devices, that is, so-called clutch-to-clutch shifting is executed in which the shifting is executed by switching between engagement and disengagement of the engaging devices. In the first embodiment, for example, downshift from the AT second gear stage to the AT first gear stage is represented as a 2→1 downshift. The same applies to other upshifts and downshifts. Further, when the transfer 12 is set to the first drive state and the second drive state, which will be described later, the stepped transmission unit 22 is placed in a neutral state as the engaging element is disengaged.

Returning to FIG. 3, the compound transmission 11 further includes a one-way clutch F0. The one-way clutch F0 is a lock mechanism capable of fixing the carrier CA0 so as not to rotate. That is, the one-way clutch F0 is a lock mechanism capable of fixing the connecting shaft 34 that is connected to the crankshaft of the engine 2 and rotates integrally with the carrier CA0 to the transmission case 110. In the one-way clutch F0, one of two members capable of rotating with respect to each other is integrally connected to the connecting shaft 34, and the other member is integrally connected to the transmission case 110. The one-way clutch F0 idles in the forward rotation direction that is the rotation direction of the engine 2 during operation, and automatically engages with the rotation direction opposite to that during operation of the engine 2. Therefore, when the one-way clutch F0 idles, the engine 2 is in a state of being able to rotate relative to the transmission case 110. On the other hand, when the one-way clutch F0 is engaged, the engine 2 is in a state of being not able to rotate relative to the transmission case 110. That is, the engine 2 is fixed to the transmission case 110 as the one-way clutch F0 is engaged. As described above, the one-way clutch F0 allows the carrier CA0 to rotate in the forward rotation direction that is the rotation direction during operation of the engine 2, and blocks the carrier CA0 from rotating in the negative rotation direction. That is, the one-way clutch F0 is a lock mechanism capable of allowing the engine 2 to rotate in the forward rotation direction and blocks the engine 2 from rotating in the negative rotation direction.

In the compound transmission 11, a continuously variable transmission in which the continuously variable transmission unit 20 and the stepped transmission unit 22 are disposed in series can be configured by the stepped transmission unit 22 in which the AT gear stages are formed and the continuously variable transmission unit 20 that is operated as the continuously variable transmission. Alternatively, the continuously variable transmission unit 20 can be caused to execute shifting in a similar manner to that of the stepped transmission. Therefore, the compound transmission 11 as a whole can be caused to execute shifting in a similar manner as that of the stepped transmission. That is, in the compound transmission 11, the stepped transmission unit 22 and the continuously variable transmission unit 20 can be controlled such that the gear stages having different gear ratios, each of which represents the value of the ratio of the engine speed to the output rotational speed, are selectively established.

Figure 5:
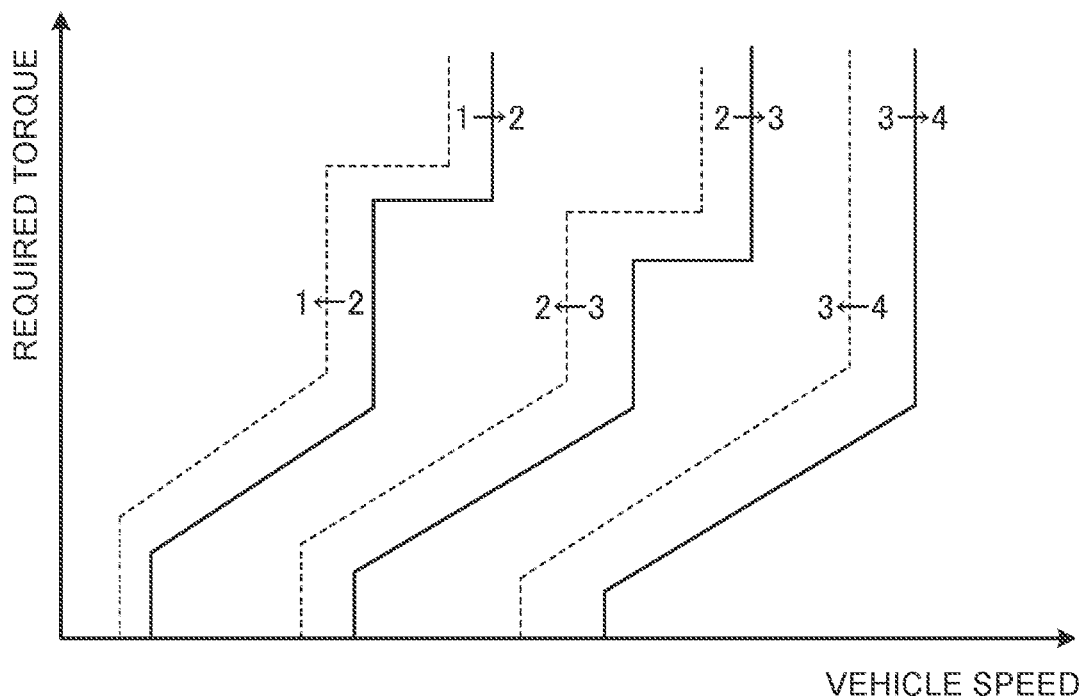
FIG. 5 is a diagram showing an example of a shift map used for shift control of the stepped transmission unit.

The electronic control device 100 executes shift determination of the stepped transmission unit 22 using an AT gear stage shift map as shown in FIG. 5 that is a predetermined relationship, for example, and executes the shift control of the stepped transmission unit 22 via the transmission control device 103 as needed. In the shift control of the stepped transmission unit 22, the transmission control device 103 outputs, to the hydraulic control circuit 111, a hydraulic control command signal for switching the engagement-disengagement state of the engaging device by each solenoid valve so as to automatically switch the AT gear stage of the stepped transmission unit 22.

The AT gear stage shift map shown in FIG. 5 has, for example, a predetermined relationship having a shift line for determining the shifting of the stepped transmission unit 22 on the two-dimensional coordinates with the required drive torque calculated based on the vehicle speed and the accelerator operation amount as variables. In the AT gear stage shift map, the output rotational speed or the like may be used instead of the vehicle speed, or the required driving force, the accelerator operation amount, the throttle valve opening, or the like may be used instead of the required drive torque. In the AT gear stage shift map shown in FIG. 5, the shift lines shown by the solid lines are each upshift line for determining the upshift, and the shift lines shown by the broken lines are each shift line for determining the downshift.

Figure 6:
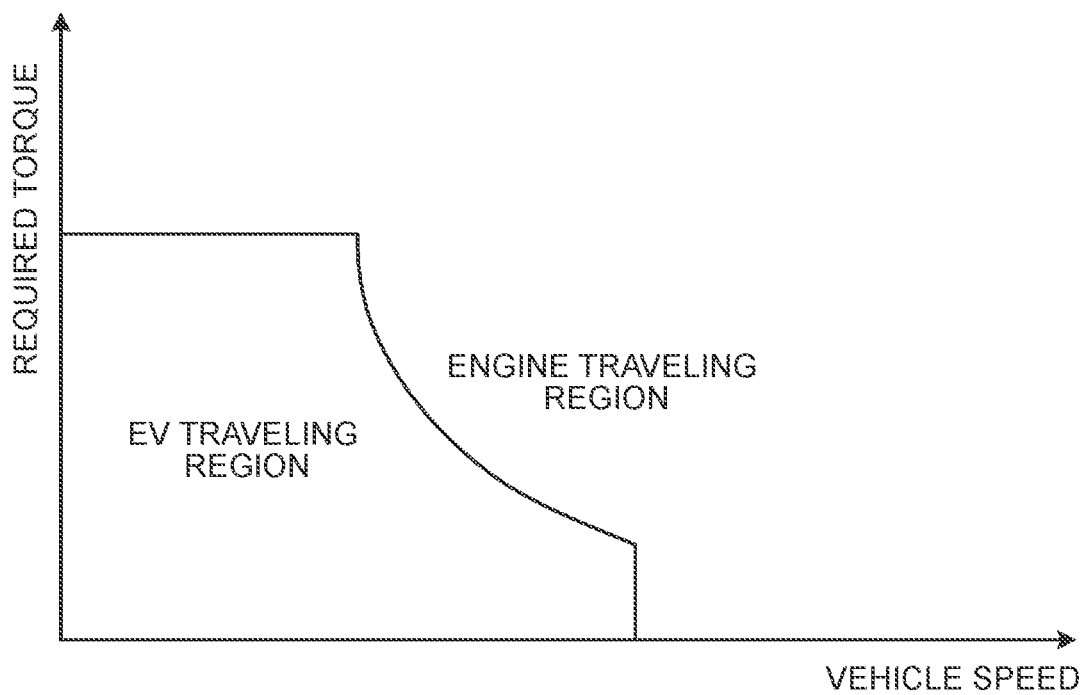
FIG. 6 is a diagram showing an example of a power source switching map used in switching control between an electronic vehicle (EV) traveling mode and an engine traveling mode.

FIG. 6 is a diagram showing an example of a power source switching map used in switching control between the EV traveling mode and the engine traveling mode. In the drive device 10 according to the first embodiment, the EV traveling mode and the engine traveling mode are switched based on the power source switching map used in the switching control between the EV traveling mode and the engine traveling mode as shown in FIG. 6. The map shown in FIG. 6 has a predetermined relationship having a boundary between a region in which that the vehicle travels in the engine traveling mode in which EV traveling is performed and a region in which the vehicle travels in the EV traveling mode in which engine traveling is performed on the two-dimensional coordinates with the vehicle speed and the required drive torque as variables. The boundary between the EV traveling region and the engine traveling region in FIG. 6 is, in other words, a switching line for switching between the EV traveling mode and the engine traveling mode.

Figure 7:
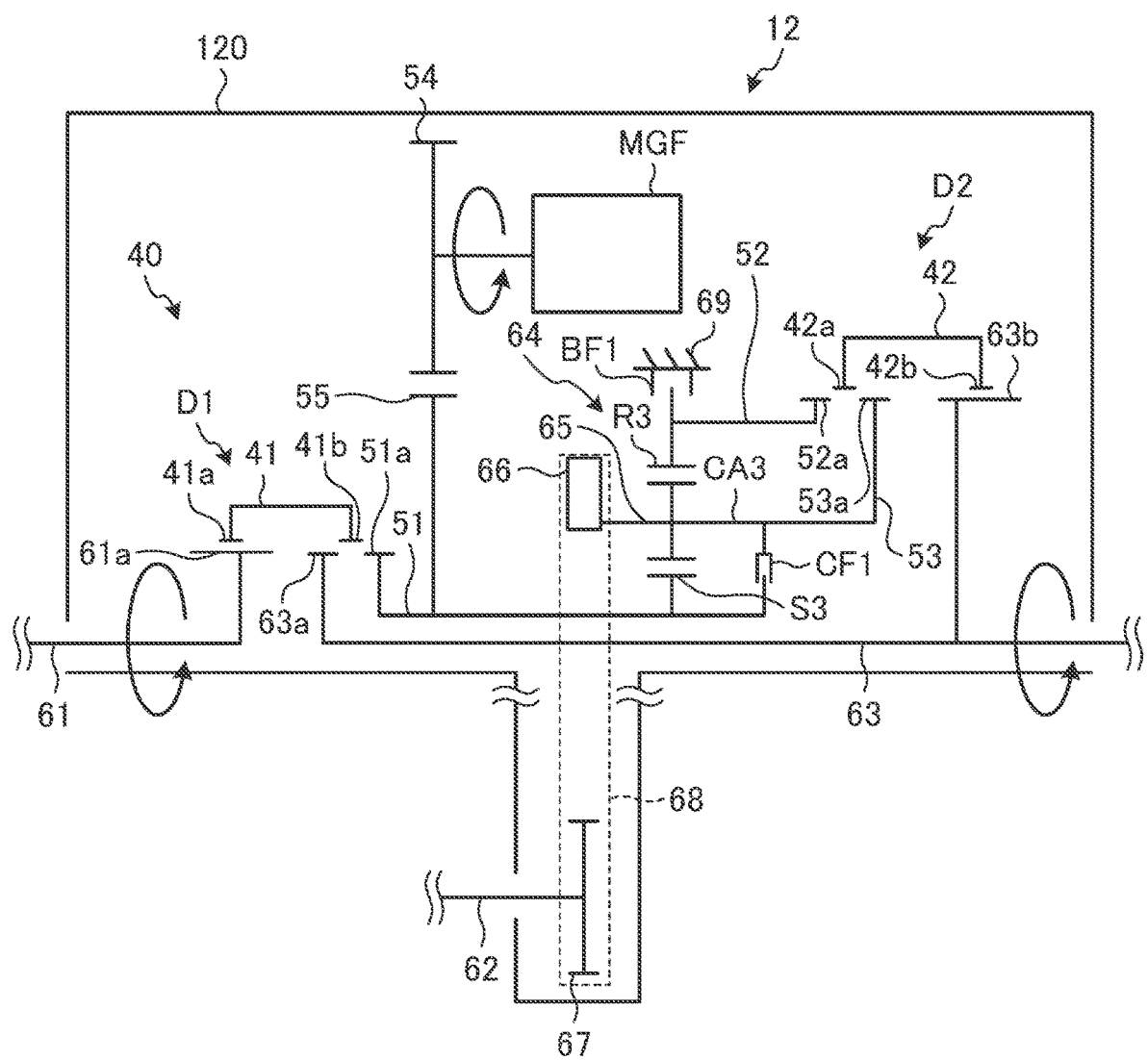
FIG. 7 is a skeleton diagram schematically showing a transfer according to the first embodiment, and is a skeleton diagram showing a case where the transfer is in a first drive state.

FIG. 7 is a skeleton diagram schematically showing the transfer 12 according to the first embodiment, and is a skeleton diagram showing a case where the transfer 12 is in a first driving state.

The transfer 12 according to the first embodiment includes a transfer case 120 that is a non-rotating member. The transfer 12 includes, in the transfer case 120, an input shaft 61, a rear wheel side output shaft 63 as a first output shaft outputting power to the rear wheels 4, a front wheel side output shaft 62 as a second output shaft outputting power to the front wheels 3, and a third planetary gear device 64 as a differential mechanism. Further, the transfer 12 includes, in the transfer case 120, a transfer member 65 that functions as an input rotating member to the front wheels 3 as a rotating member constituting a power transfer path for the front wheels 3, a drive gear 66 that outputs power to the front wheel side output shaft 62, a driven gear 67 integrally provided with the front wheel side output shaft 62, and a front wheel drive chain 68 that connects the drive gear 66 and the driven gear 67. Further, the transfer 12 includes, in the transfer case 120, the third rotating electric machine MGF that functions as a second power source, a connection switching device 40 that switches the connection state of the rotating members, a brake BF1, and a clutch CF1.

The input shaft 61 is an input rotating member that inputs power from the engine 2 (and the first rotating electric machine MG1 and the second rotating electric machine MG2) to the transfer 12. The power from the engine 2 is transferred to the input shaft 61 via the compound transmission 11. For example, the input shaft 61 is spline-fitted to the output shaft 24 that is an output rotating member of the compound transmission 11.

The rear wheel side output shaft 63 is an output rotating member that outputs power from the transfer 12 to the rear wheels 4. The rear wheel side output shaft 63 is a drive shaft disposed coaxially with the input shaft 61 and connected to the rear propeller shaft 14 (see FIG. 1).

The front wheel side output shaft 62 is an output rotating member that outputs power from the transfer 12 to the front wheels 3. The front wheel side output shaft 62 is a drive shaft disposed on a different axis from the input shaft 61 and the rear wheel side output shaft 63 and connected to the front propeller shaft 13 (see FIG. 1). The front wheel side output shaft 62 rotates via the front wheel drive chain 68 and the driven gear 67 as the drive gear 66 rotates.

The drive gear 66 is connected to the transfer member 65 so as to rotate integrally. The transfer member 65 is a rotating member that transfers power to the front wheel side output shaft 62. The transfer member 65 and the drive gear 66 are disposed so as to be rotatable relative to the rear wheel side output shaft 63. In the transfer 12, the transfer member 65, the drive gear 66, and the third planetary gear device 64 are disposed on the same rotation center as the rear wheel side output shaft 63.

The third planetary gear device 64 is configured by a single pinion type planetary gear device including three rotating elements. As shown in FIG. 7, the third planetary gear device 64 includes, as the three rotating elements, a sun gear S3, a carrier CA3 that supports a plurality of pairs of pinion gears that mesh with each other so as to be rotatable and revolvable, and a ring gear R3 that meshes with the sun gear S3 via the pinion gears. The third rotating electric machine MGF that functions as the second power source is constantly connected to the sun gear S3. When the transfer 12 is placed in the second drive state and the sixth drive state, which will be described later, the sun gear S3 functions as an input element, the ring gear R3 functions as a reaction force element, and the carrier CA3 functions as an output element.

A first rotating member 51 that can be connected to the input shaft 61 is connected to the sun gear S3. The first rotating member 51 is a member that rotates integrally with the sun gear S3 and includes gear teeth 51a. Further, the first rotating member 51 is attached with an input gear 55 to which power from the third rotating electric machine MGF is input. The input gear 55 and the first rotating member 51 rotate integrally.

A third rotating member 53 that can be connected to the rear wheel side output shaft 63 is connected to the carrier CA3. The third rotating member 53 is a member that rotates integrally with the carrier CA3 and includes gear teeth 53a. Further, the transfer member 65 is connected to the carrier CA3. The transfer member 65 is a member that rotates integrally with the carrier CA3.

The second rotating member 52 that can be connected to the rear wheel side output shaft 63 is connected to the ring gear R3. The second rotating member 52 is a member that rotates integrally with the ring gear R3 and includes gear teeth 52a.

The third rotating electric machine MGF is a motor generator (MG) capable of functioning as a motor and a generator. The third rotating electric machine MGF includes a rotor, a stator, and an output shaft that rotates integrally with the rotor, and is electrically connected to the battery via an inverter. As shown in FIG. 7, an output gear 54 is provided on the output shaft of the third rotating electric machine MGF. The output gear 54 meshes with the input gear 55, and the output gear 54 and the input gear 55 constitute a reduction gear train. Therefore, when MGF torque that is the output torque from the third rotating electric machine MGF is transferred to the input gear 55, rotation of the third rotating electric machine MGF is subjected to speed change (decelerated) and transferred to the sun gear S3.

The connection switching device 40 is a device that selectively switches the connection destinations of the input shaft 61 and the rear wheel side output shaft 63. In other words, the connection switching device 40 is a device for switching the connection state of the rotating members constituting the transfer 12. Specifically, the connection switching device 40 selectively switches the connection destinations of the first rotating member 51, the second rotating member 52, and the third rotating member 53 that rotate integrally with each rotating element of the third planetary gear device 64. As shown in FIG. 7, the connection switching device 40 includes a first dog clutch D1 and a second dog clutch D2.

The first dog clutch D1 is a first disconnection-connection mechanism for switching the connection destination of the input shaft 61. As shown in FIG. 7, the first dog clutch D1 selectively connects the input shaft 61 and the first rotating member 51 (sun gear S3) or the rear wheel side output shaft 63. That is, the first dog clutch D1 switches between a first input state and a second input state. In the first input state, the power from the input shaft 61 is transferred to the rear wheel side output shaft 63 without intervening the third planetary gear device 64. In the second input state, the power from the input shaft 61 is transferred to the rear wheel side output shaft 63 via the third planetary gear device 64.

The first dog clutch D1 includes a first switching sleeve 41 as an input switching member. The first switching sleeve 41 includes first gear teeth 41a that mesh with gear teeth 61a of the input shaft 61 and second gear teeth 41b that mesh with first gear teeth 63a of the rear wheel side output shaft 63 or the gear teeth 51a of the first rotating member 51. The first switching sleeve 41 is moved in the axial direction by the actuator of the first dog clutch D1. The first switching sleeve 41 is switched to any of a first input state in which the meshing target of the second gear teeth 41b mesh with the first gear teeth 63a of the rear wheel side output shaft 63 while the first gear teeth 41a constantly mesh with the gear teeth 61a of the input shaft 61, a disengaged state in which the second gear teeth 41b do not mesh with any of the first gear teeth 63a of the rear wheel side output shaft 63 and the gear teeth 51a of the first rotating member 51, and a second input state in which the second gear teeth 41b mesh with the gear teeth 51a of the first rotating member 51.

The second dog clutch D2 is a second disconnection-connection mechanism for switching the connection destination of the rear wheel side output shaft 63. The second dog clutch D2 selectively connects the rear wheel side output shaft 63 and the second rotating member 52 (ring gear R3) or the third rotating member 53 (carrier CA3). That is, the second dog clutch D2 switches between a first transfer state in which power is transferred between the rear wheel side output shaft 63 and the second rotating member 52 (ring gear R3), and a second transfer state in which power is transferred between the rear wheel side output shaft 63 and the third rotating member 53 (carrier CA3).

The second dog clutch D2 includes a second switching sleeve 42 as a switching member. The second switching sleeve 42 includes first gear teeth 42a and second gear teeth 42b. The first gear teeth 42a of the second switching sleeve 42 can selectively mesh with the gear teeth 52a of the second rotating member 52 that rotates integrally with the ring gear R3 and the gear teeth 53a of the third rotating member 53 that rotates integrally with the carrier CA3. The second switching sleeve 42 is moved in the axial direction by the actuator of the second dog clutch D2. Then, the second switching sleeve 42 is switched to any of a first transfer state in which the first gear teeth 42a mesh with the gear teeth 52a of the second rotating member 52 while the second gear teeth 42b constantly mesh with the second gear teeth 63b of the rear wheel side output shaft 63, a disengaged state in which the first gear teeth 42a do not mesh with any of the gear teeth 52a of the second rotating member 52 and the gear teeth 53a of the third rotating member 53, and a second transfer state in which the first gear teeth 42a mesh with the gear teeth 53a of the third rotating member 53.

The brake BF1 selectively fixes the ring gear R3 of the third planetary gear device 64 to a fixing member 69. The fixing member 69 is the transfer case 120 itself or a non-rotating member integrated with the transfer case 120. The transfer 12 is set to the high-speed side shift stage Hi when the brake BF1 is disengaged, and is set to the low-speed side shift stage Lo when the brake BF1 is engaged. The clutch CF1 selectively connects the sun gear S3 and the carrier CA3 of the third planetary gear device 64.

Figures 8, 9:
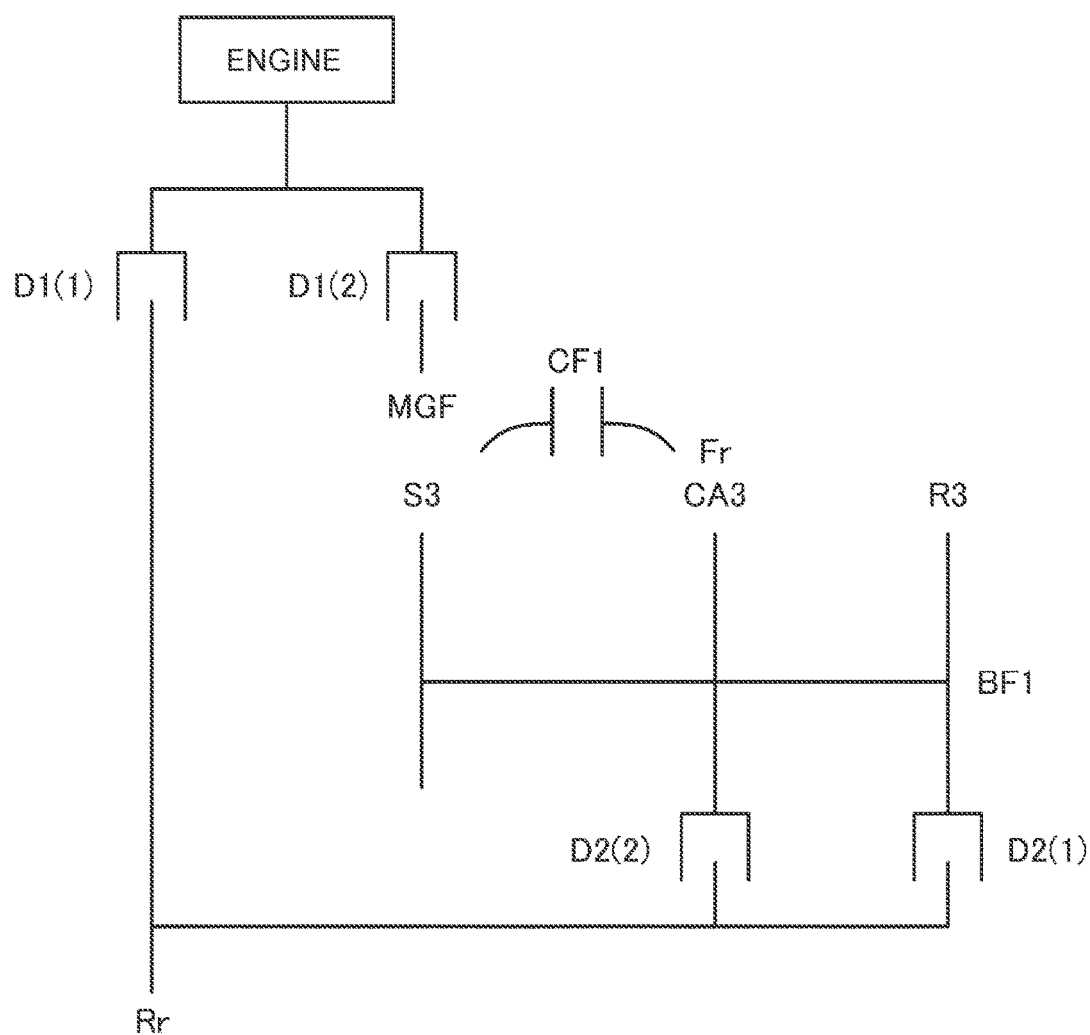
FIG. 8 is a diagram showing the engagement relationship of each rotating member in the transfer according to the first embodiment.
FIG. 9 is a diagram showing the relationship between each of the drive states of the transfer and an operating state of each engaging device.

FIG. 8 is a diagram showing the engagement relationship of each rotating member in the transfer 12 according to the first embodiment. In FIG. 8, the third rotating electric machine MGF is referred to as "MGF", the sun gear S3 is "S3", the carrier CA3 is "CA3", the ring gear R3 is "R3", the brake BF1 is "BF1", the clutch CF1 is "CF1", the front wheel side output shaft 62 is "Fr", and the rear wheel side output shaft 63 is "Rr". Further, in FIG. 8, D1 (1) indicates the connection location of the first dog clutch D1 in the first input state, and D1 (2) indicates the connection location of the first dog clutch D1 in the second input state. Further, in FIG. 8, D2 (1) shows the connection point of the second dog clutch D2 in the first transfer state, and D2 (2) shows the connection point of the second dog clutch D2 in the second transfer state.

The transfer 12 according to the first embodiment includes the rear wheel side output shaft 63, the front wheel side output shaft 62, and the third planetary gear device 64. The rear wheel side output shaft 63 is the first output shaft that is connected to the engine 2 (and the first rotating electric machine MG1 and the second rotating electric machine MG2) as the first power source and outputs the power to the rear wheels 4 that are one of the front wheels 3 and the rear wheels 4. The front wheel side output shaft 62 is the second output shaft that outputs the power to the front wheels 3 that are the other of the front wheels 3 and the rear wheels 4. The third planetary gear device 64 is the differential mechanism including the sun gear S3 that is the first rotating element, the carrier CA3 that is the second rotating element, and the ring gear R3 that is the third rotating element. Further, the transfer 12 according to the first embodiment includes the brake BF1 that selectively fixes the ring gear R3 to the fixing member 69. Further, the transfer 12 according to the first embodiment is configured to input at least the power from the engine 2 that is the first power source to the sun gear S3, and fix the ring gear R3 to the fixing member 69 to decelerate the power input to the sun gear S3 and output the power from the carrier CA3 to the rear wheel side output shaft 63 and the front wheel side output shaft 62 such that the vehicle can travel in the four-wheel drive state. Further, the transfer 12 according to the first embodiment is configured to input the power from the third rotating electric machine MGF that is the second power source to the sun gear S3, and fix the ring gear R3 to the fixing member 69 to decelerate the power input to the sun gear S3 and output the power from the carrier CA3 to the front wheel side output shaft 62 that is one of the first output shaft and the second output shaft such that the vehicle can travel in the two-wheel drive state.

Then, the drive state of the transfer 12 according to the first embodiment is switched by the electronic control device 100 such that a first drive state, a second drive state, a third drive state, a fourth drive state, a fifth drive state, and a sixth drive state can be set.

Here, the first drive state to the sixth drive state will be described. FIG. 9 is a diagram showing the relationship between each of the drive states of the transfer 12 and an operating state of each engaging device. In FIG. 9, a white circle indicates engagement, a white triangle indicates engagement as needed, and blank indicates disengagement.

The first drive state shown in FIG. 7 is a drive state in the EV traveling mode in which the vehicle 1 travels using the power from the third rotating electric machine MGF in the EV(FF)_Hi mode, and also in the two-wheel drive state in which the power from the third rotating electric machine MGF is transferred only to the front wheels 3. In the first drive state, the transfer 12 is set to a high-speed side shift stage Hi.

When the transfer 12 is in the first drive state, as shown in FIG. 9, the brake BF1 is disengaged, the clutch CF1 is engaged, the first dog clutch D1 is disengaged, and the second dog clutch D2 is disengaged. In the first drive state, the third planetary gear device 64 is in a direct connection state in which the sun gear S3 and the carrier CA3 are connected by the clutch CF1. In the first drive state, when the power from the third rotating electric machine MGF is transferred to the front wheel side output shaft 62, the rotation of the third rotating electric machine MGF is transferred to the front wheel side output shaft 62 without speed change by the third planetary gear device 64.

Figure 10:
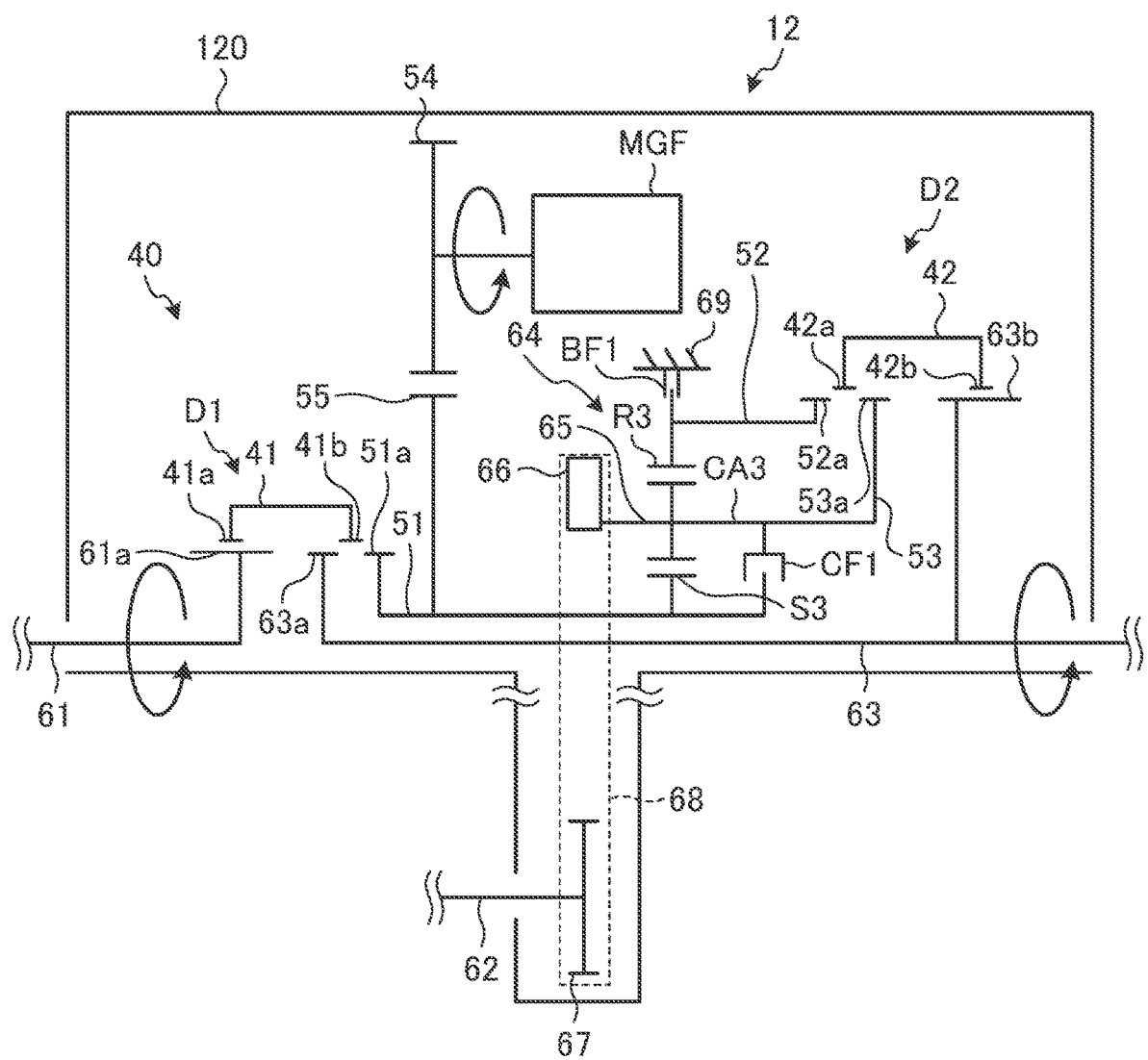
FIG. 10 is a skeleton diagram showing a case where the transfer according to the first embodiment is in a second drive state.

FIG. 10 is a skeleton diagram showing a case where the transfer 12 according to the first embodiment is in the second drive state. The second drive state is a drive state in the EV traveling mode in which the vehicle 1 travels using the power from the third rotating electric machine MGF in the EV(FF)_Lo mode, and also in the two-wheel drive state in which the power from the third rotating electric machine MGF is transferred only to the front wheels 3. In the second drive state, the transfer 12 is set to a low-speed side shift stage Lo.

When the transfer 12 is in the second drive state, as shown in FIG. 9, the brake BF1 is engaged, the clutch CF1 is disengaged, the first dog clutch D1 is disengaged, and the second dog clutch D2 is disengaged. In the second drive state, the third planetary gear device 64 is in a speed reduction state in which the ring gear R3 is mechanically fixed to the fixing member 69 by the brake BF1. In the second drive state, when the power from the third rotating electric machine MGF is transferred to the front wheel side output shaft 62, the rotation of the third rotating electric machine MGF is transferred to the front wheel side output shaft 62 after speed reduction by the third planetary gear device 64.

Figure 11:
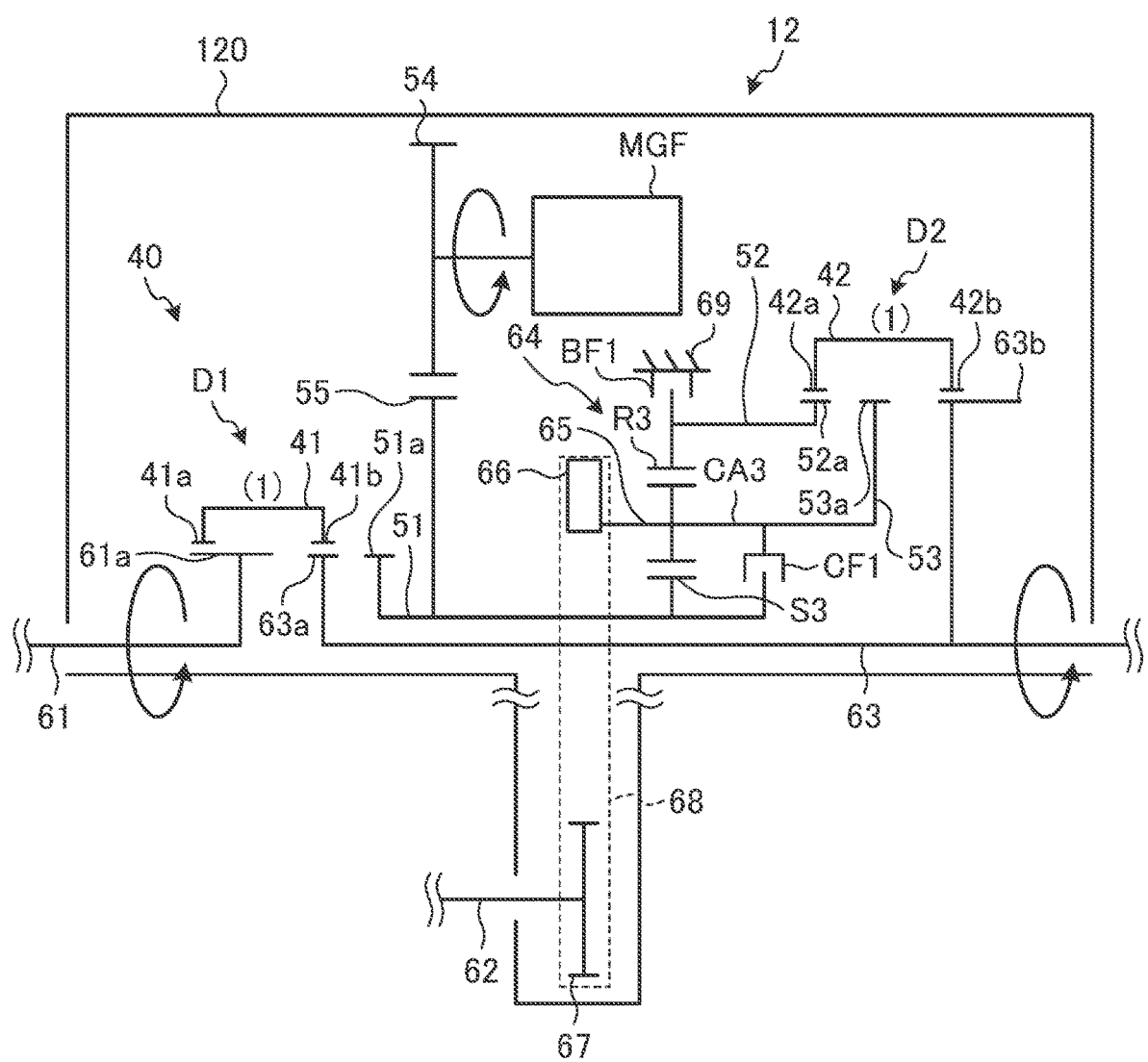
FIG. 11 is a skeleton diagram showing a case where the transfer according to the first embodiment is in a third drive state.

FIG. 11 is a skeleton diagram showing a case where the transfer 12 according to the first embodiment is in the third drive state. The third drive state is a drive state in a mode in which the power transferred to the transfer 12 in the H4_torque split mode is distributed to the front wheel 3 side and the rear wheel 4 side to cause the vehicle 1 to travel, and is also in the four-wheel drive state in which the power is transferred to the front wheels 3 and the rear wheels 4. In the third drive state, the torque distribution ratio at which the torque from the input shaft 61 is distributed to the front wheel side output shaft 62 and the rear wheel side output shaft 63 is changed with the MGF torque from the third rotating electric machine MGF. In other words, the sun gear S3 of the third planetary gear device 64 receives the torque transferred from the rear wheel side output shaft 63 to the ring gear R3 of the third planetary gear device 64 with the MGF torque from the third rotating electric machine MGF as a reaction force such that the torque transferred to the ring gear R3 is distributed to the front wheel 3 side and the rear wheel 4 side at an arbitrary ratio. In the third drive state, the transfer 12 is set to the high-speed side shift stage Hi.

When the transfer 12 is in the third drive state, as shown in FIG. 9, the brake BF1 is disengaged, the clutch CF1 is disengaged, the first dog clutch D1 is in the first input state, and the second dog clutch D2 is in the first transfer state. Note that, (1) in the first dog clutch D1 in FIG. 11 indicates that the first dog clutch D1 is in the first input state. Further, (1) in the second dog clutch D2 in FIG. 11 indicates that the second dog clutch D2 is in the first transfer state.

Figure 12:
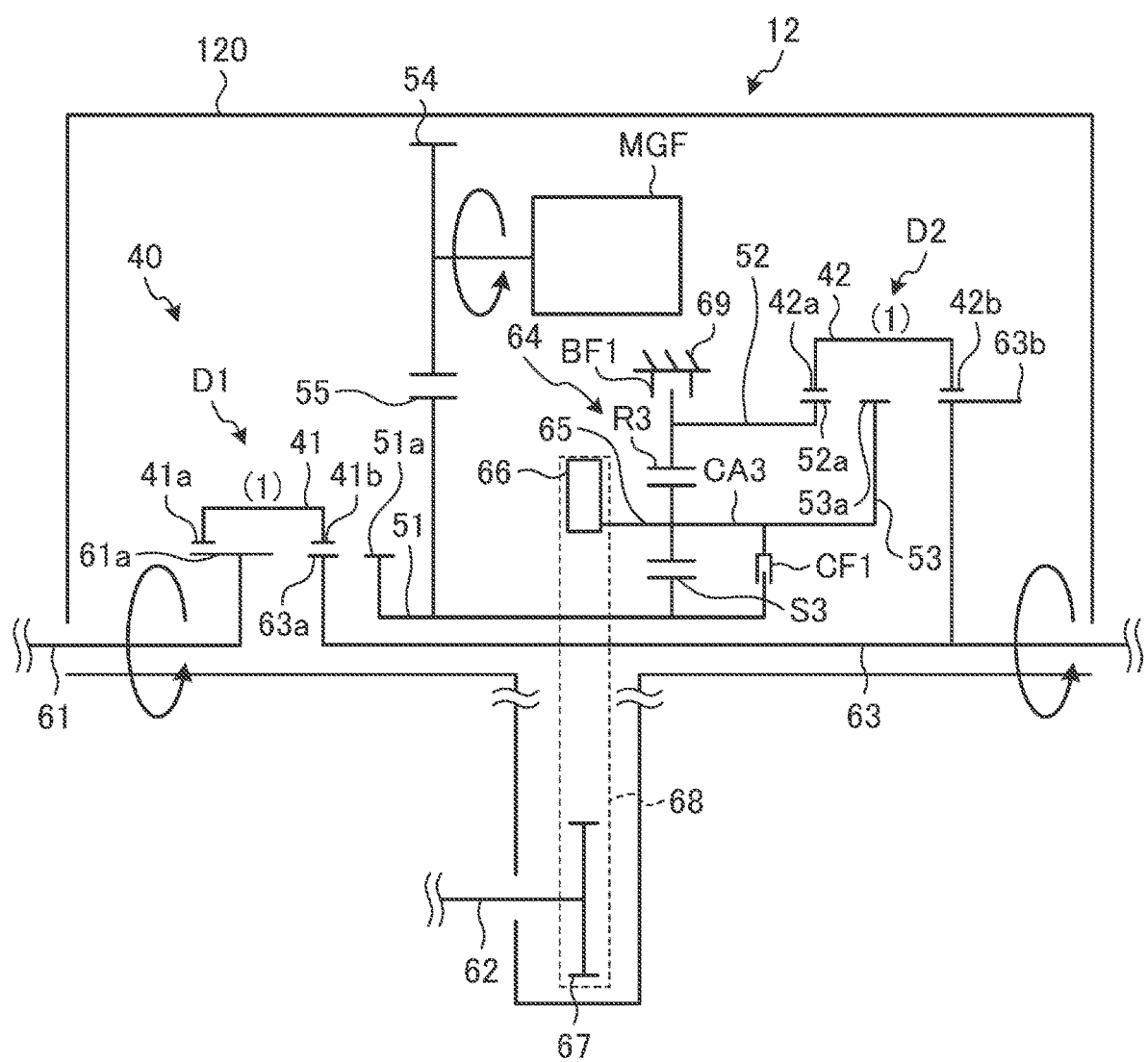
FIG. 12 is a skeleton diagram showing a case where the transfer according to the first embodiment is in a fourth drive state.

FIG. 12 is a skeleton diagram showing a case where the transfer 12 according to the first embodiment is in the fourth drive state. The fourth drive state is a drive state in a mode in which the power transferred to the transfer 12 in the H4_LSD mode is distributed to the front wheel 3 side and the rear wheel 4 side to cause the vehicle 1 to travel, and is also in the four-wheel drive state in which the power is transferred to the front wheels 3 and the rear wheels 4. The fourth drive state is a drive state in which the rotational differential between the front wheel side output shaft 62 and the rear wheel side output shaft 63 is restricted by the engagement control of the clutch CF1. In the fourth drive state, the torque distribution ratio at which the torque from the input shaft 61 is distributed to the front wheel side output shaft 62 and the rear wheel side output shaft 63 is changed by the engagement control of the clutch CF1. In the fourth drive state, the transfer 12 is set to the high-speed side shift stage Hi.

When the transfer 12 is in the fourth drive state, as shown in FIG. 9, the brake BF1 is disengaged, the clutch CF1 is under engagement control (half engaged), the first dog clutch D1 is in the first input state, and the second dog clutch D2 is in the first transfer state. Note that, (1) in the first dog clutch D1 in FIG. 12 indicates that the first dog clutch D1 is in the first input state. Further, (1) in the second dog clutch D2 in FIG. 12 indicates that the second dog clutch D2 is in the first transfer state.

Figure 13:
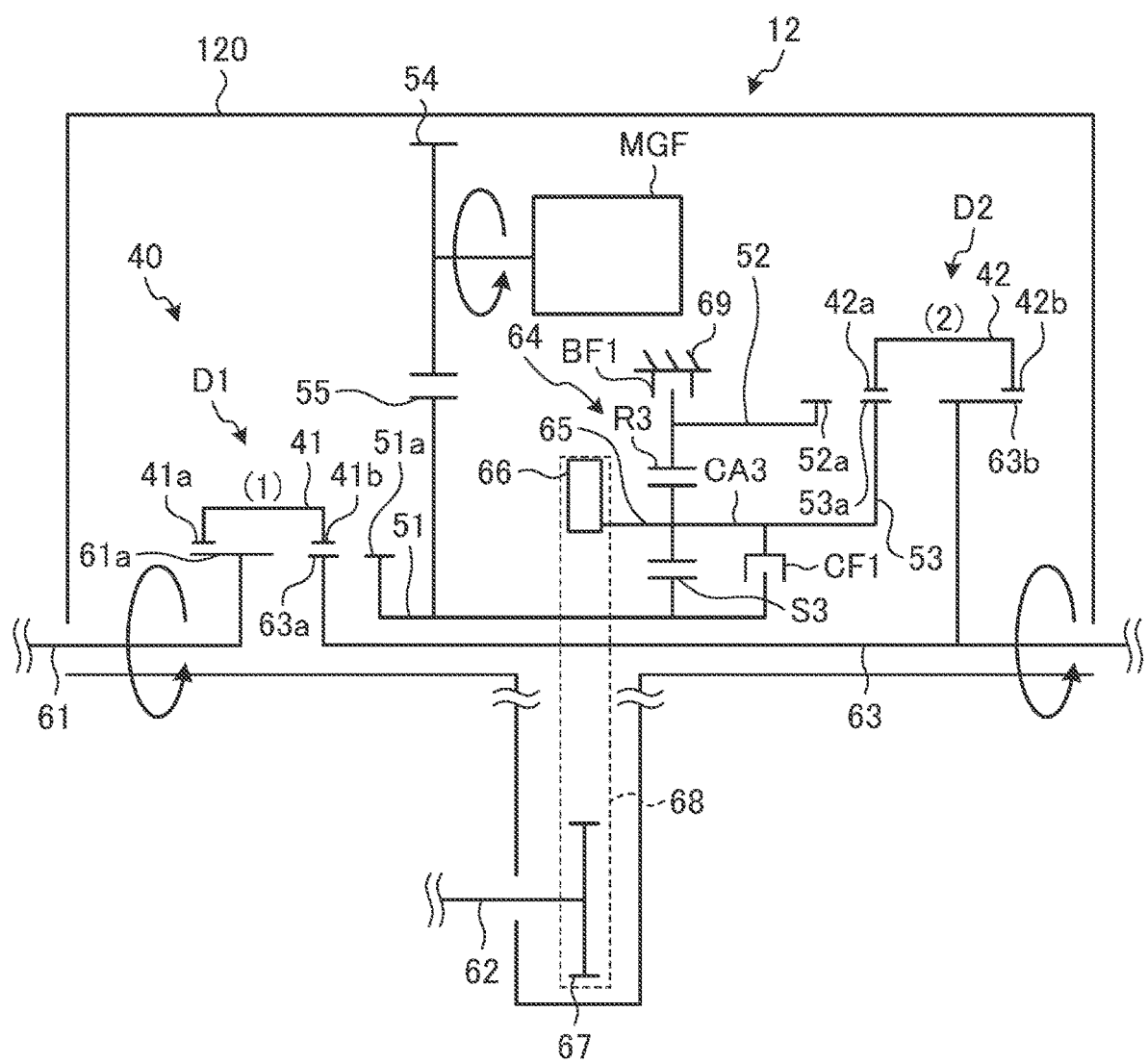
FIG. 13 is a skeleton diagram showing a case where the transfer according to the first embodiment is in a fifth drive state.

FIG. 13 is a skeleton diagram showing a case where the transfer 12 according to the first embodiment is in the fifth drive state. The fifth drive state is a drive state in a mode in which the power transferred to the transfer 12 in the H4_Lock mode (fixed distribution 4WD) is distributed to the front wheel 3 side and the rear wheel 4 side to cause the vehicle 1 to travel, and is also in a four-wheel drive state in which the power is transferred to the front wheels 3 and the rear wheels 4. The fifth drive state is a drive state in which the rotational differential between the front wheel side output shaft 62 and the rear wheel side output shaft 63 is disabled, and the torque distribution ratio at which the torque from the input shaft 61 is distributed to the front wheel side output shaft 62 and the rear wheel side output shaft 63 is fixed. Note that, in the fifth drive state, the transfer 12 is set to the high-speed side shift stage Hi.

When the transfer 12 is in the fifth drive state, as shown in FIG. 9, the brake BF1 is disengaged, the clutch CF1 is disengaged, the first dog clutch D1 is in the first input state, and the second dog clutch D2 is in the second transfer state. Note that, (1) in the first dog clutch D1 in FIG. 13 indicates that the first dog clutch D1 is in the first input state. Further, (2) in the second dog clutch D2 in FIG. 13 indicates that the second dog clutch D2 is in the second transfer state.

Figure 14:
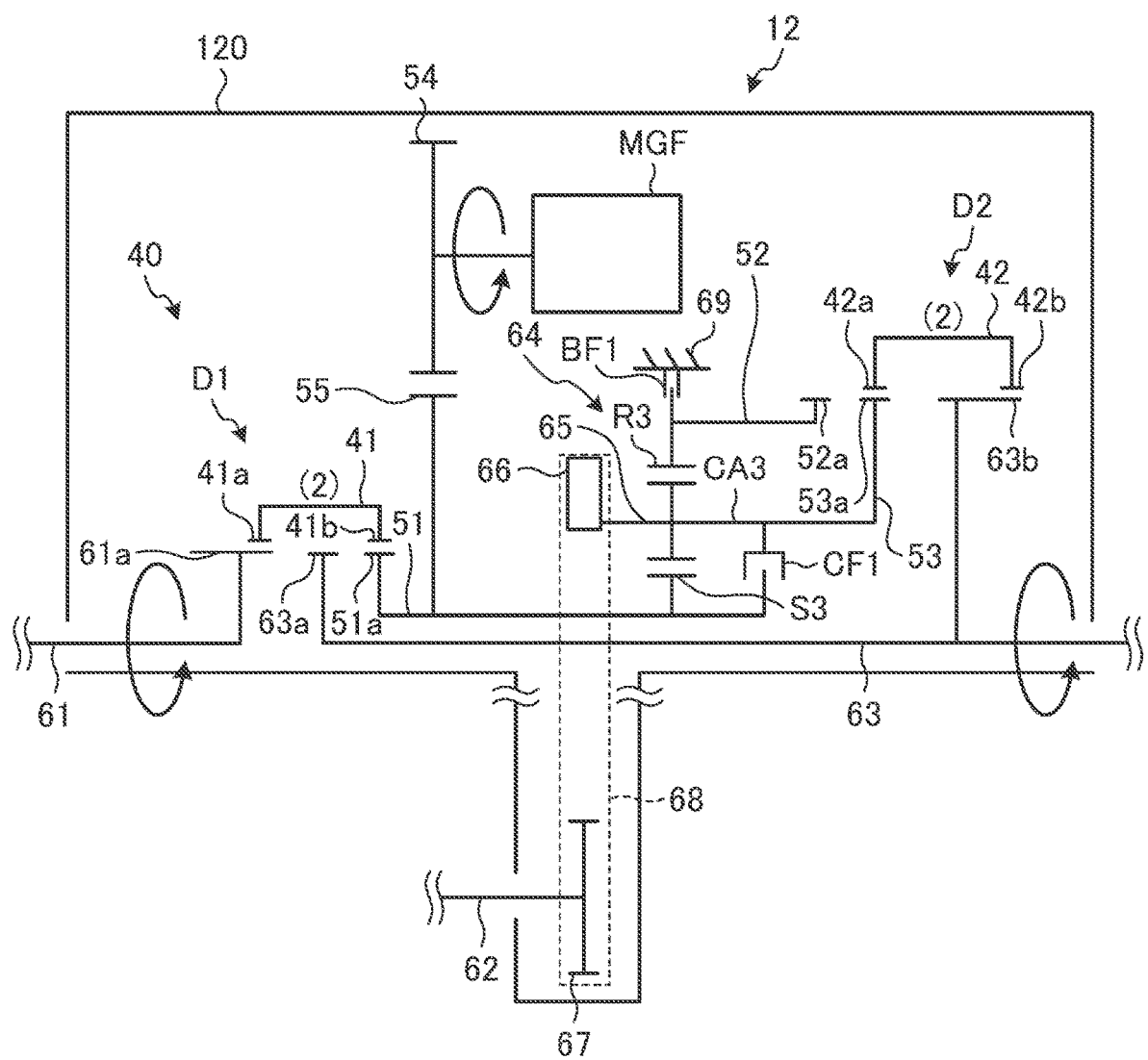
FIG. 14 is a skeleton diagram showing a case where the transfer according to the first embodiment is in a sixth drive state.

FIG. 14 is a skeleton diagram showing a case where the transfer 12 according to the first embodiment is in the sixth drive state. The sixth drive state is a drive state in a mode in which the power transferred to the transfer 12 in the L4_Lock mode (fixed distribution 4WD) is distributed to the front wheel 3 side and the rear wheel 4 side to cause the vehicle 1 to travel, and is also in the four-wheel drive state in which the power is transferred to the front wheels 3 and the rear wheels 4. The sixth drive state is a drive state in which the rotational differential between the front wheel side output shaft 62 and the rear wheel side output shaft 63 is disabled, and the torque distribution ratio at which the torque from the input shaft 61 is distributed to the front wheel side output shaft 62 and the rear wheel side output shaft 63 is fixed. In the sixth drive state, the transfer 12 is set to the low-speed side shift stage Lo.

When the transfer 12 is in the sixth drive state, as shown in FIG. 9, the brake BF1 is engaged, the clutch CF1 is disengaged, the first dog clutch D1 is in the second input state, and the second dog clutch D2 is in the second transfer state. Note that, (2) in the first dog clutch D1 in FIG. 14 indicates that the first dog clutch D1 is in the second input state. Further, (2) in the second dog clutch D2 in FIG. 14 indicates that the second dog clutch D2 is in the second transfer state.

In the transfer 12 according to the first embodiment, the drive states can be switched between the first drive state and the second drive state, and the third drive state and the fourth drive state in accordance with the traveling state of the vehicle 1. Further, in the fifth drive state, the drive states can be switched between the fifth state and the third drive state and the fourth drive state as the driver turns on and off the Lock selection switch 92 provided on the vehicle 1. Further, in the sixth drive state, the drive states can be switched between the fifth drive state and the sixth drive state as the driver turns on and off the Low selection switch 90 provided on the vehicle 1 when the vehicle is stopped.

In order to switch the drive state of the transfer 12, the electronic control device 100 controls the hydraulic control circuit 111 by the transfer control device 104 based on output signals from various sensors mounted on the vehicle 1, the 4WD selection switch 86, the Low selection switch 90, and the like, and controls the operating states of the actuator that operates the first dog clutch D1 and the second dog clutch D2, the brake BF1, and the clutch CF1.

Figure 15:
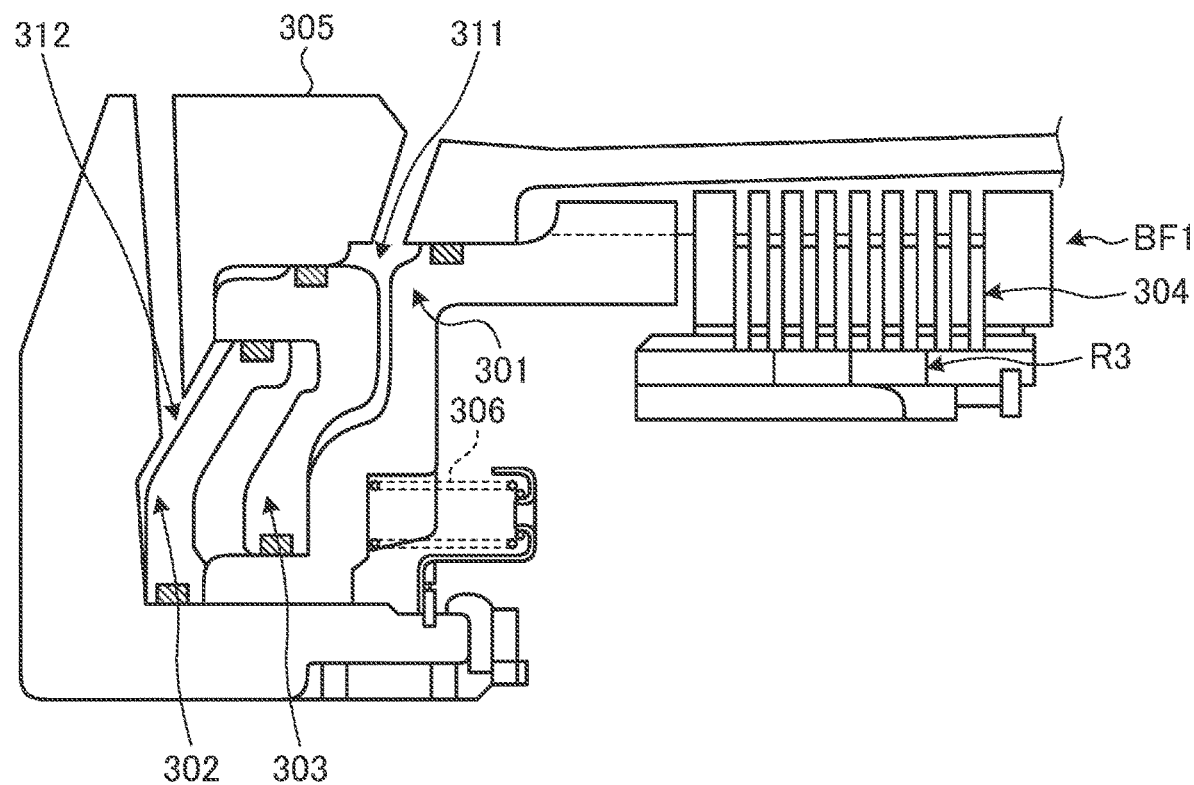
FIG. 15 is a diagram showing a schematic configuration of a brake.

FIG. 15 is a diagram showing a schematic configuration of the brake BF1. The brake BF1 is a hydraulic friction engaging device, and includes a plurality of friction plates 304, a first piston 301 and a second piston 302 that press the friction plates 304, and a first piston hydraulic chamber 311 and a second piston hydraulic chamber 312 for applying a hydraulic pressure Pbf1 to each of the first piston 301 and the second piston 302.

In the brake BF1, the second piston 302 and a partition wall member 303 are provided in the space surrounded by a case member 305 and the first piston 301. The first piston 301 and the second piston 302 are in contact with each other and are movable. The partition wall member 303 is provided between the first piston 301 and the second piston 302 such that the hydraulic pressure Pbf1 acts on the back surface of the first piston 301 and does not act on the front surface of the second piston 302. The first piston hydraulic chamber 311 is provided on the back side of the first piston 301, and the second piston hydraulic chamber 312 is provided on the back side of the second piston 302. Further, the brake BF1 is provided with a return spring 306 as an urging member that urges the first piston 301 to the left in FIG. 15. Then, the urging force of the return spring 306 causes the first piston 301 and the second piston 302 to move to the left in FIG. 15 such that the friction plates 304 are separated and the brake BF1 is disengaged.

The hydraulic pressure Pbf1 is supplied from the hydraulic control circuit 111 to the first piston hydraulic chamber 311 and the second piston hydraulic chamber 312 of the brake BF1. The hydraulic control circuit 111 is provided with a switching valve 227 and an electromagnetic valve SF1 as described later. When a valve body 228 of the switching valve 227 is set to a first position by the electromagnetic valve SF1, the hydraulic pressure Pbf1 is supplied to the first piston hydraulic chamber 311 and the second piston hydraulic chamber 312. When the hydraulic pressure Pbf1 is supplied to the first piston hydraulic chamber 311 and the second piston hydraulic chamber 312, the first piston 301 and the second piston 302 abut against each other and move to the right in FIG. 15 to press the friction plates 304 so as to engage the brake BF1. At this time, as the pressing force of the friction plates 304, a high pressing force can be obtained with the back surface of the first piston 301 and the back surface of the second piston 302 as the pressure receiving surfaces for the hydraulic pressure Pbf1, and the engaging force (torque capacity) of the brake BF1 with respect to the hydraulic pressure Pbf1 is increased. Further, when the valve body 228 of the switching valve 227 is set to a second position by the electromagnetic valve SF1, the hydraulic pressure Pbf1 is supplied only to the first piston hydraulic chamber 311. When the hydraulic pressure Pbf1 is supplied to the first piston hydraulic chamber 311, the first piston 301 moves to the right in FIG. 15 and presses the friction plates 304 so as to engage the brake BF1. At this time, as the pressing force of the friction plates 304, a high pressing force can be obtained with the back surface of the first piston 301 only as the pressure receiving surface for the hydraulic pressure Pbf1, and the engaging force (torque capacity) of the brake BF1 with respect to the hydraulic pressure Pbf1 is reduced.

Figure 16:
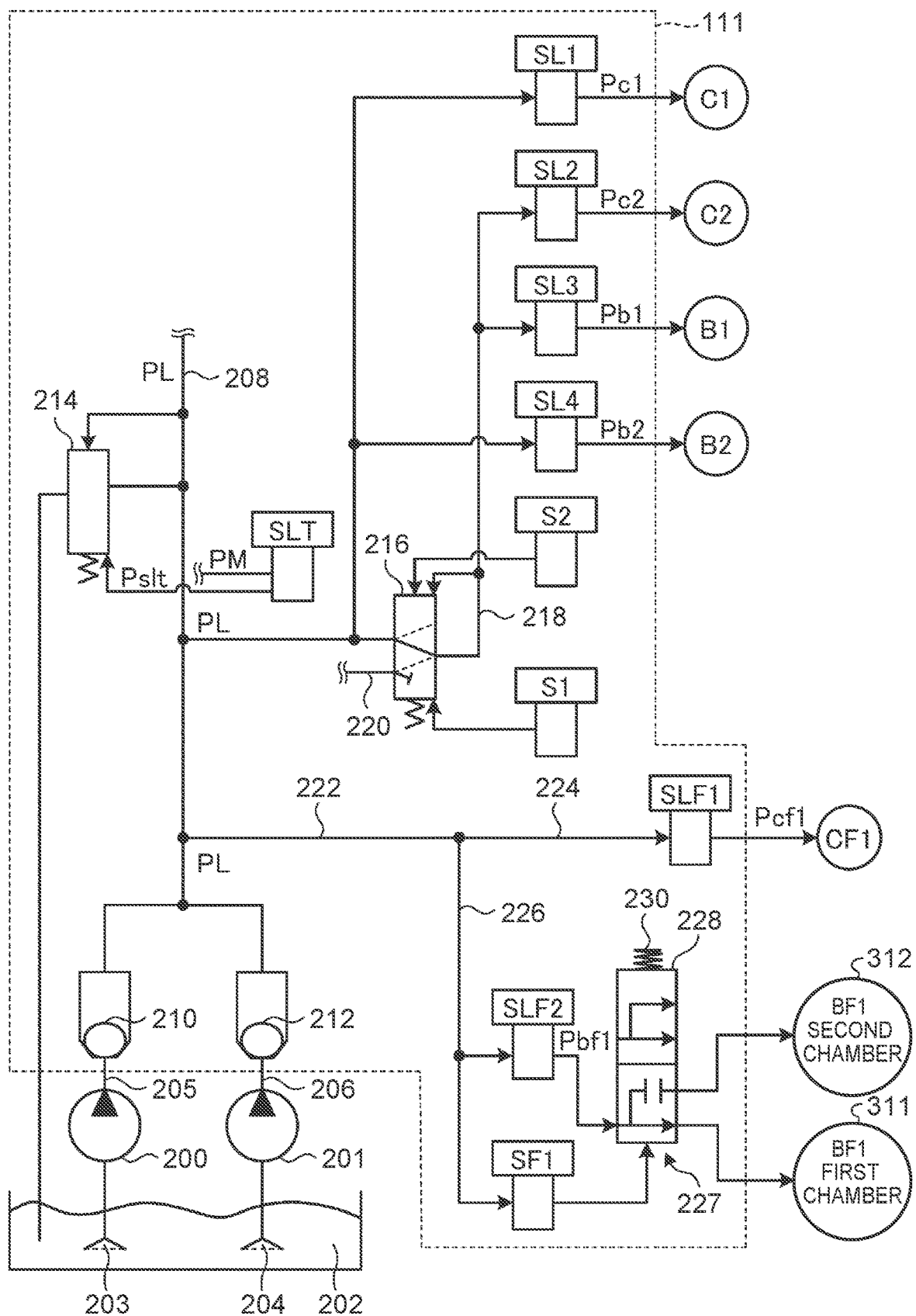
Figure 17:
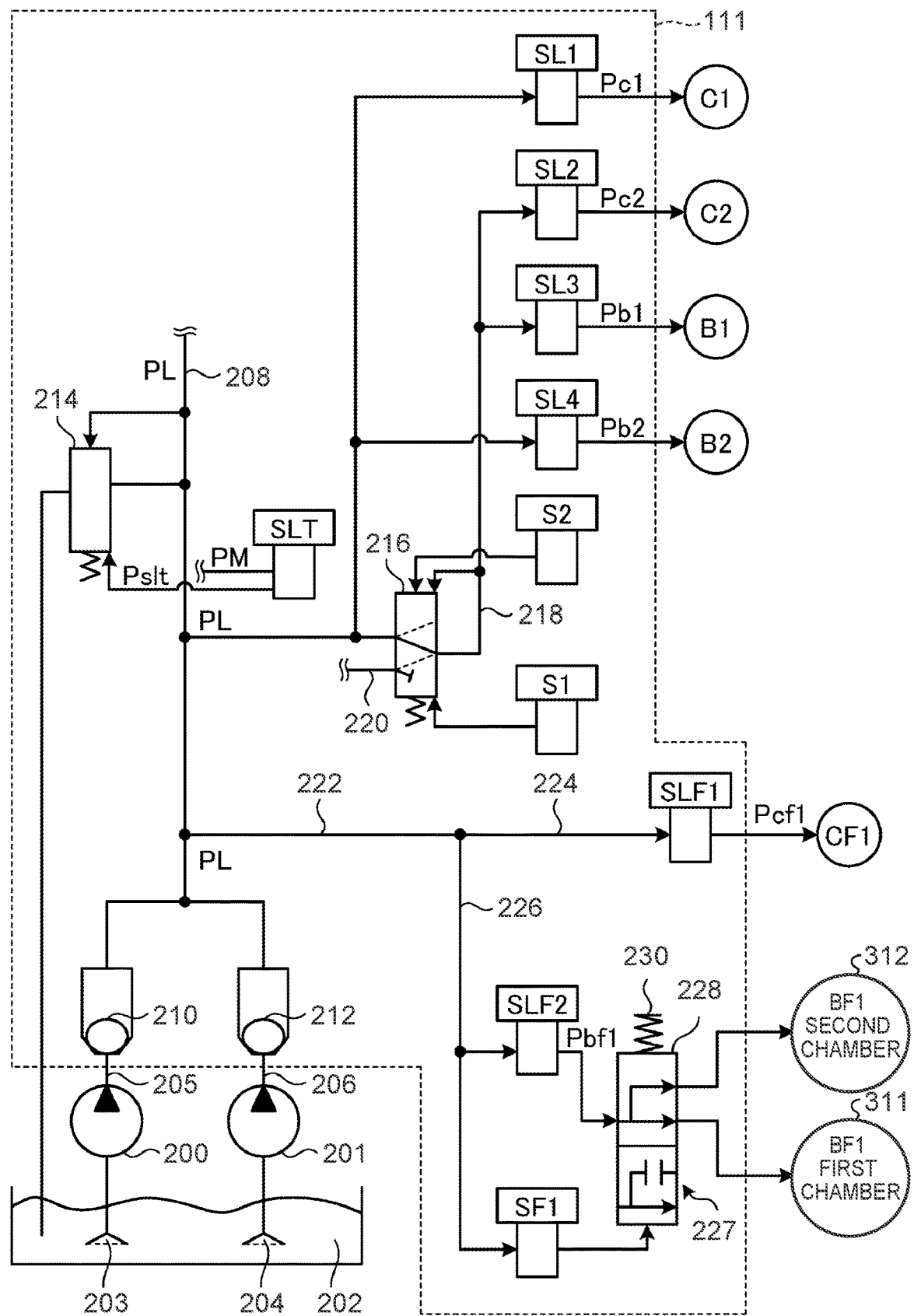
FIG. 17 is a diagram showing the hydraulic control circuit in a state where the electromagnetic valve is off.

FIG. 16 is a diagram showing the hydraulic control circuit 111 in a state where the electromagnetic valve SF1 is on. FIG. 17 is a diagram showing the hydraulic control circuit 111 in a state where the electromagnetic valve SF1 is off.

In FIG. 16, a mechanical oil pump 200 and an electric oil pump 201 are provided in parallel due to the structure of an oil passage through which the hydraulic oil flows. The mechanical oil pump 200 and the electric oil pump 201 each discharge the hydraulic oil that serves as the base of the hydraulic pressure for switching the operating state of each engaging device and supplying lubricant oil to each portion of the compound transmission 11 and the transfer 12. The mechanical oil pump 200 and the electric oil pump 201 each suck the hydraulic oil that has returned to an oil pan 202 through strainers 203, 204 that are suction ports, and discharge the hydraulic oil to discharge oil passages 205, 206 of the mechanical oil pump 200 and the electric oil pump 201, respectively. The discharge oil passages 205, 206 are each connected to an oil passage provided in the hydraulic control circuit 111, for example, a line pressure oil passage 208 that is an oil passage through which a line pressure PL flows. The discharge oil passage 205 to which the hydraulic oil is discharged from the mechanical oil pump 200 is connected to the line pressure oil passage 208 via a check valve 210 for the mechanical oil pump provided in the hydraulic control circuit 111. The discharge oil passage 206 to which the hydraulic oil is discharged from the electric oil pump 201 is connected to the line pressure oil passage 208 via a check valve 212 for the electric oil pump provided in the hydraulic control circuit 111. The mechanical oil pump 200 rotates together with the engine 2 to generate an operating hydraulic pressure. The electric oil pump 201 can generate the operating hydraulic pressure regardless of the rotational state of the engine 2.

The hydraulic control circuit 111 includes a regulator valve 214, a switching valve 216, and supply oil passages 218, 222, 224, 226, discharge oil passage 220, the switching valve 227, solenoid valves SLT, S1, S2, SL1, SL2, SL3, SL4, SLF1, SLF2, the electromagnetic valve SF1 and the like in addition to the line pressure oil passage 208, the check valve 210 for the mechanical oil pump, and the check valve 212 for the electric oil pump.

The regulator valve 214 regulates the line pressure PL based on the hydraulic oil discharged from at least one of the mechanical oil pump 200 and the electric oil pump 201. The solenoid valve SLT is, for example, a linear solenoid valve, and is controlled by the electronic control device 100 so as to output, to the regulator valve 214, a pilot pressure Pslt corresponding to the input torque to the stepped transmission unit 22 and the like. With this configuration, the line pressure PL is set to the hydraulic pressure corresponding to the input torque of the stepped transmission unit 22 and the like. The source pressure input to the solenoid valve SLT is, for example, a modulator pressure PM adjusted to a constant value by a modulator valve (not shown) with the line pressure PL as the source pressure.

The oil passage of the switching valve 216 is switched based on the hydraulic pressure output from the solenoid valves S1, S2. The solenoid valves S1, S2 each are, for example, an on-off solenoid valve, and controlled by the electronic control device 100 so as to output the hydraulic pressure to the switching valve 216. When the switching valve 216 is placed in a state where the hydraulic pressure is output from the solenoid valve S2 and is not output from the solenoid valve S1, the oil passage is switched so as to connect the line pressure oil passage 208 and the supply oil passage 218. When the switching valve 216 is placed in a state where the hydraulic pressure is output from both the solenoid valves S1, S2, a state where the hydraulic pressure is not output from either of the solenoid valves S1, S2, or a state where the hydraulic pressure is output from the solenoid valve Si and is not output from the solenoid valve S2, the oil passage between the line pressure oil passage 208 and the supply oil passage 218 is blocked and the oil passage is switched such that the supply oil passage 218 is connected to the discharge oil passage 220. The supply oil passage 218 is an oil passage through which the source pressure input to the solenoid valves SL2, SL3 flows. The discharge oil passage 220 is an open-air oil passage that discharges the hydraulic oil in the hydraulic control circuit 111 to the outside of the hydraulic control circuit 111, that is, returns the hydraulic oil to the oil pan 202. For example, when the operation position of the shift lever 89 is the D operation position for selecting the forward traveling position of the compound transmission 11 that enables the vehicle 1 to travel forward, the electronic control device 100 outputs, to the hydraulic control circuit 111, a hydraulic pressure control command signal for causing the solenoid valve S2 to output the hydraulic pressure and causing the solenoid valve S1 not to output the hydraulic pressure. For example, when the operation position of the shift lever 89 is the R operation position for selecting the reverse traveling position of the compound transmission 11 that enables the vehicle 1 to travel rearward, the electronic control device 100 outputs, to the hydraulic control circuit 111, a hydraulic pressure control command signal for causing the solenoid valves S1, S2 to output the hydraulic pressure.

The solenoid valves SL1, SL2, SL3, SL4 are, for example, linear solenoid valves, and controlled by the electronic control device 100 so as to output the hydraulic pressures Pc1, Pc2, Pb1, Pb2 to the hydraulic actuators of the engaging devices, respectively. The solenoid valve SL1 regulates the hydraulic pressure Pc1 supplied to the hydraulic actuator of the clutch C1 using the line pressure PL as the source pressure. The solenoid valve SL2 regulates the hydraulic pressure Pc2 supplied to the hydraulic actuator of the clutch C2 using the line pressure PL via the switching valve 216 as the source pressure. The solenoid valve SL3 regulates the hydraulic pressure Pb1 supplied to the hydraulic actuator of the brake B1 using the line pressure PL via the switching valve 216 as the source pressure. The solenoid valve SL4 regulates the hydraulic pressure Pb2 supplied to the hydraulic actuator of the brake B2 using the line pressure PL as the source pressure.

The solenoid valve SLF1 is, for example, a linear solenoid valve, and is controlled by the electronic control device 100 so as to output the hydraulic pressure Pcf1 to the hydraulic actuator of the clutch CF1. The solenoid valve SLF1 regulates the hydraulic pressure Pcf1 supplied to the hydraulic actuator of the clutch CF1 using the line pressure PL as the source pressure.

The solenoid valve SLF2 is, for example, a linear solenoid valve, and is controlled by the electronic control device 100 so as to output the hydraulic pressure Pbf1 to the first piston hydraulic chamber 311 (BF1 first chamber in FIG. 16) and the second piston hydraulic chamber 312 (BF1 second chamber in FIG. 16) of the brake BF1 via the switching valve 227. The solenoid valve SLF2 regulates the hydraulic pressure Pbf1 supplied to the first piston hydraulic chamber 311 and the second piston hydraulic chamber 312 of the brake BF1 using the line pressure PL as the source pressure.

The switching valve 227 includes the valve body 228 of which position can be switched between a first position at which the hydraulic pressure Pbf1 output from the solenoid valve SL2 to the first piston hydraulic chamber 311 and the second piston hydraulic chamber 312 of the brake BF1 and a second position at which the hydraulic pressure Pbf1 is supplied only to the first piston hydraulic chamber 311. The switching valve 227 switches the position of the valve body 228 between the first position and the second position based on the hydraulic pressure output from the electromagnetic valve SF1. The electromagnetic valve SF1 is controlled by the electronic control device 100 so as not to generate the hydraulic pressure when the current supplied to the electromagnetic valve SF1 is off and does not flow, and to generate the hydraulic pressure when the current supplied to the electromagnetic valve SF1 is turned on and flows.

The hydraulic control circuit 111 shown in FIG. 16 is in a state where the current supplied to the electromagnetic valve SF1 is turned on and the hydraulic pressure is generated. In this state, the valve body 228 of the switching valve 227 is pushed up against the urging force of a spring 230 by the hydraulic pressure from the electromagnetic valve SF1 to reach the second position. With this configuration, the hydraulic pressure Pbf1 from the solenoid valve SLF2 is supplied only to the first piston hydraulic chamber 311 of the brake BF1.

On the other hand, the hydraulic control circuit 111 shown in FIG. 17 is in a state where the current supplied to the electromagnetic valve SF1 is off and the hydraulic pressure is not generated. In this state, the hydraulic pressure from the electromagnetic valve SF1 is not applied to the switching valve 227. Therefore, the valve body 228 of the switching valve 227 is pushed down by the urging force of the spring 230 to reach the first position. With this configuration, the hydraulic pressure Pbf1 from the solenoid valve SLF2 is supplied to the first piston hydraulic chamber 311 (BF1 first chamber in FIG. 17) and the second piston hydraulic chamber 312 (BF1 second chamber in FIG. 17) of the brake BF1.

In the transfer 12 according to the first embodiment, the L4_Lock mode can be set as the first traveling mode in which the power from the engine 2 is input to the sun gear S3 of the third planetary gear device 64, and the ring gear R3 of the third planetary gear device 64 is fixed to the fixing member 69 by the brake BF1 such that the power input to the sun gear S3 is decelerated and output from the carrier CA3 of the third planetary gear device 64 to the front wheel side output shaft 62 and the rear wheel side output shaft 63 to cause the vehicle 1 to travel in the four-wheel drive state.

Further, in the transfer 12 according to the first embodiment, the EV(FF)_Lo mode can be set as the second traveling mode in which the power from the third rotating electric machine MGF is input to the sun gear S3 of the third planetary gear device 64, and the third planetary gear device 64 is fixed to the fixing member 69 by the brake BF1 such that the power input to the sun gear S3 is decelerated and output from the carrier CA3 of the third planetary gear device 64 to the front wheel side output shaft 62 to cause the vehicle 1 to travel in the two-wheel drive state.

Then, in the first embodiment, when the L4_Lock mode is set, the electronic control device 100 controls the hydraulic control circuit 111 such that the hydraulic pressure Pbf1 is supplied to the first piston hydraulic chamber 311 and the second piston hydraulic chamber 312. When the EV(FF)_Lo mode is set, the electronic control device 100 controls the hydraulic control circuit 111 such that the hydraulic pressure Pbf1 is supplied only to the first piston hydraulic chamber 311. The power input from the engine 2 to the sun gear S3 in the L4_Lock mode is larger than the power input to the sun gear S3 from the third rotating electric machine MGF in the EV(FF)_Lo mode. With this configuration, when the EV(FF)_Lo mode is set while the torque capacity of the brake BF1 is matched with the torque capacity required in the L4_Lock mode, the torque capacity of the brake BF1 with respect to the hydraulic pressure Pbf1 is reduced, whereby the shock when the EV(FF)_Lo mode is set can be suppressed.

Further, in the first embodiment, the hydraulic control circuit 111 includes the switching valve 227 provided with the valve body 228 of which position can be switched between the first position at which the hydraulic pressure Pbf1 is supplied to the first piston hydraulic chamber 311 and the second piston hydraulic chamber 312 and the second position at which the hydraulic pressure Pbf1 is supplied only to the first piston hydraulic chamber 311, and the electromagnetic valve SF1 that switches the position of the valve body 228 between the first position and the second position. When the electromagnetic valve SF1 is turned off, the position of the valve body 228 is set to the first position. With this configuration, when a failure that the electromagnetic valve SF1 is off occurs, the hydraulic pressure Pbf1 can be supplied to the first piston hydraulic chamber 311 and the second piston hydraulic chamber 312. Therefore, the torque capacity of the brake BF1 can be matched with the torque capacity required in the L4_Lock mode.

Further, in the first embodiment, the electronic control device 100 may prohibit setting of the EV(FF)_Lo mode when the failure that the electromagnetic valve SF1 is off occurs. With this configuration, it is possible to suppress the shock caused by setting the EV(FF)_Lo mode when the failure that the electromagnetic valve SF1 is off occurs.

Further, in the first embodiment, the electronic control device 100 may reduce the hydraulic pressure Pbf1 to be supplied to the first piston hydraulic chamber 311 and the second piston hydraulic chamber 312 for setting the EV(FF)_Lo mode when the failure that the electromagnetic valve SF1 is off occurs. With this configuration, it is possible to suppress a shock caused by setting the EV(FF)_Lo mode when the failure that the electromagnetic valve SF1 is off occurs.

Figure 18:
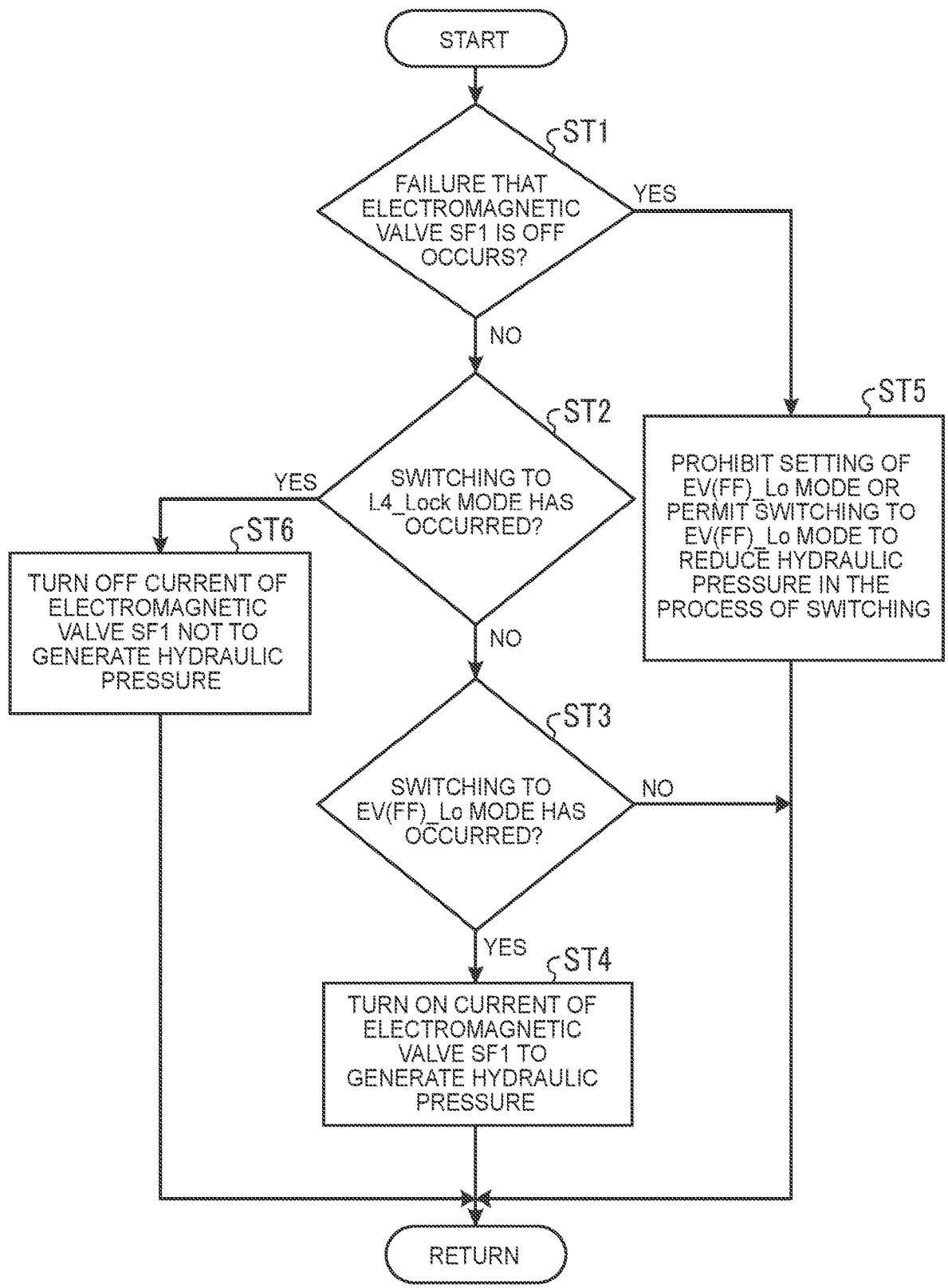
FIG. 18 is a flowchart showing an example of control executed by the electronic control device of the vehicle according to the first embodiment.

FIG. 18 is a flowchart showing an example of control executed by the electronic control device 100 according to the first embodiment.

First, the electronic control device 100 determines in step ST1 whether the failure that the electromagnetic valve SF1 is off occurs. When the electronic control device 100 determines that the failure that the electromagnetic valve SF1 is off does not occur (No in step ST1), the electronic control device 100 determines whether switching to the L4_Lock mode has occurred in step ST2. When the electronic control device 100 determines that switching to the L4_Lock mode has not occurred (No in step ST2), the electronic control device 100 determines whether switching to the EV(FF)_Lo mode has occurred in step ST3.

When the electronic control device 100 determines that switching to the EV(FF)_Lo mode has not occurred (No in step ST3), the electronic control device 100 returns a series of controls. On the other hand, when the electronic control device 100 determines that switching to the EV(FF)_Lo mode has occurred (Yes in step ST3), the current of the electromagnetic valve SF1 is turned on in step ST4 to generate the hydraulic pressure. With this configuration, the valve body 228 of the switching valve 227 is positioned at the second position as shown in FIG. 16, and when the mode is switched to the EV(FF)_Lo mode, the hydraulic pressure Pbf1 from the solenoid valve SLF2 is supplied to the first piston hydraulic chamber 311 of the brake BF1. After that, the electronic control device 100 returns a series of controls.

Further, when the electronic control device 100 determines in step ST1 that the failure that the electromagnetic valve SF1 is off occurs (Yes in step ST1), the electronic control device 100 prohibits setting of the EV(FF)_Lo mode or permits switching to the EV(FF)_Lo mode to reduce the hydraulic pressure Pbf1 in the process of switching in step ST5. With this configuration, when setting of the EV(FF)_Lo mode is prohibited, the shock caused by setting the EV(FF)_Lo mode at the time when the failure that the electromagnetic valve SF1 is off occurs can be suppressed. Further, when switching to the EV(FF)_Lo mode is permitted and the hydraulic pressure Pbf1 in the process of switching is reduced, the shock caused by setting the EV(FF)_Lo mode at the time when the failure that the electromagnetic valve SF1 is off occurs can be suppressed. Further, when the EV(FF)_Lo mode is already in use, the EV(FF)_Lo mode is immediately switched to the EV(FF)_Hi mode. After that, the electronic control device 100 returns a series of controls.

Further, when the electronic control device 100 determines in step ST2 that switching to the L4_Lock mode has occurred (Yes in step ST2), the current of the electromagnetic valve SF1 is turned off in step ST6 and the hydraulic pressure is not generated. With this configuration, the valve body 228 of the switching valve 227 is positioned at the first position as shown in FIG. 17, and when the mode is switched to the H4_Lock mode, the hydraulic pressure Pbf1 from the solenoid valve SLF2 is supplied to the first piston hydraulic chamber 311 and the second piston hydraulic chamber 312 of the brake BF1. After that, the electronic control device 100 returns a series of controls.

Figure 19:
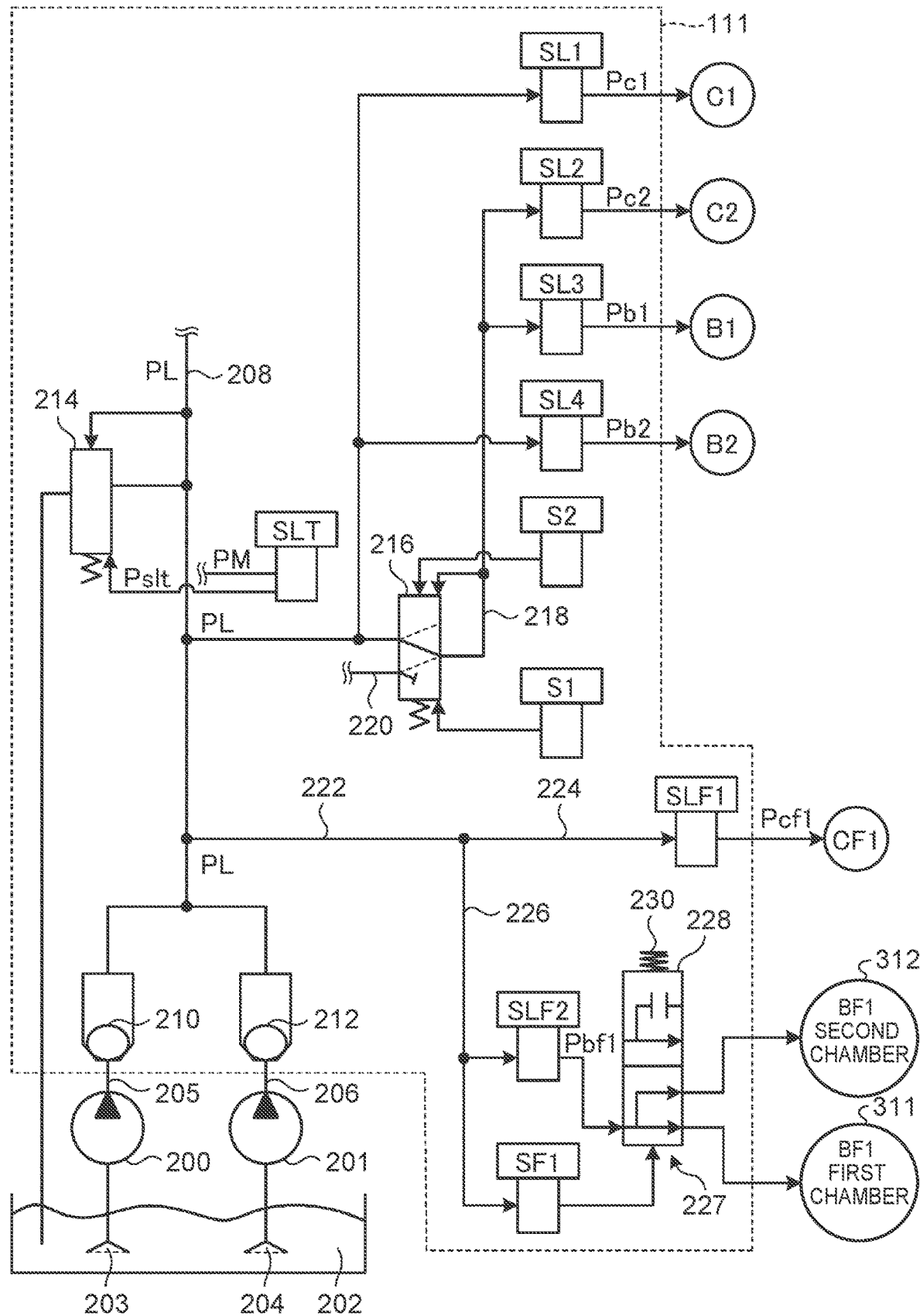
Figure 20:
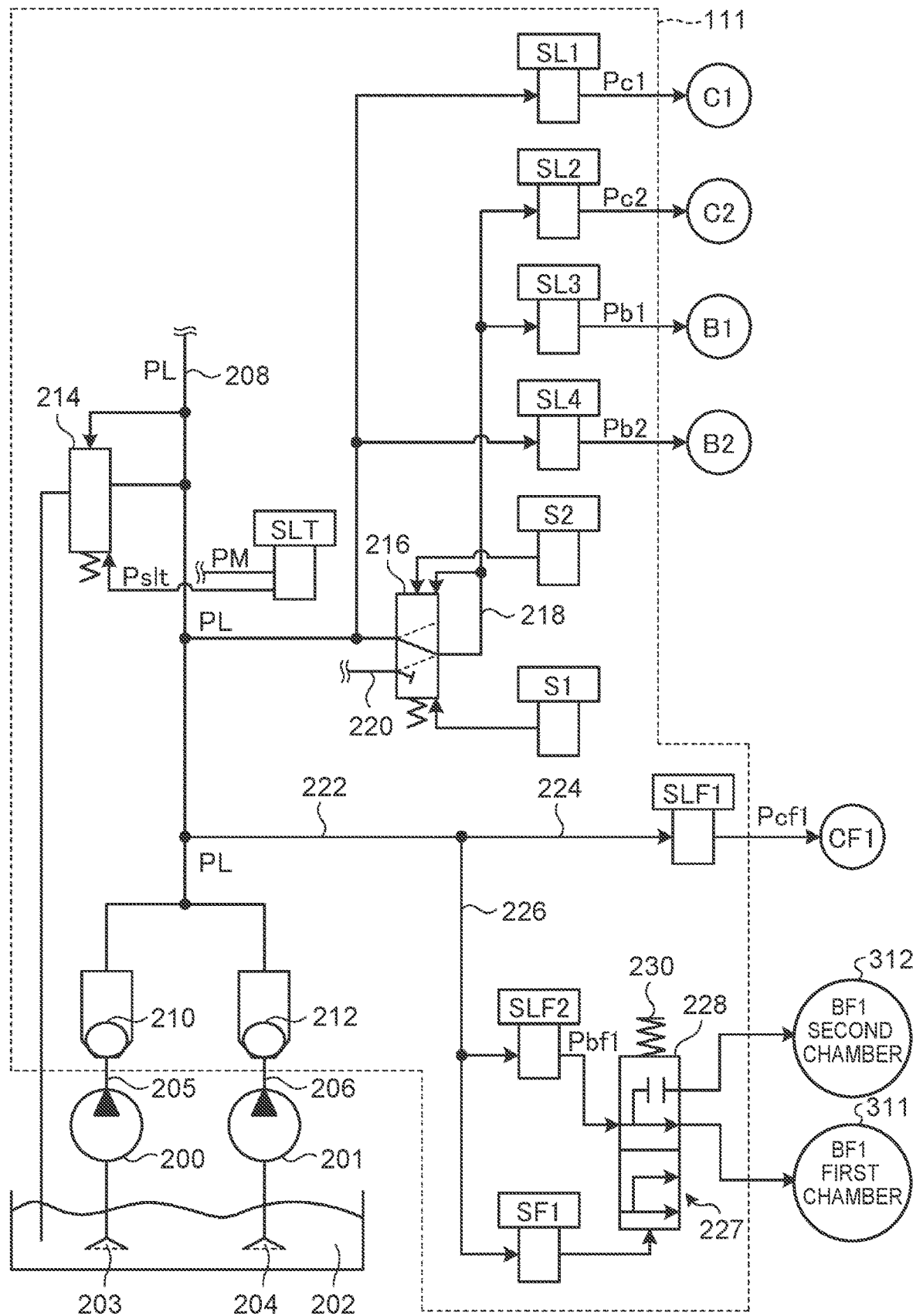
FIG. 20 is a diagram showing the hydraulic control circuit in the modification in a state where the electromagnetic valve is off.

In the drive device 10 according to the first embodiment, as a modification, the switching valve 227 provided in the hydraulic control circuit 111 may be configured such that the valve body 228 is positioned at the first position as shown in FIG. 19 when the electromagnetic valve SF1 is turned on, and the valve body 228 is positioned at the second position as shown in FIG. 20 when the electromagnetic valve SF1 is turned off. With this configuration, when the failure that the electromagnetic valve SF1 is off occurs, the hydraulic pressure Pbf1 is supplied only to the first piston hydraulic chamber 311. Therefore, the torque capacity of the brake BF1 can be matched with the torque capacity required in the EV(FF)_Lo mode.

Further, in the modification, the electronic control device 100 may prohibit setting of the L4_Lock mode when the failure that the electromagnetic valve SF1 is off occurs. With this configuration, it is possible to suppress deterioration of durability of the friction plates 304 caused by setting the L4_Lock mode when the failure that the electromagnetic valve SF1 is off occurs.

Further, in the modification, the electronic control device 100 may reduce the torque (engine torque) output from the engine 2 during traveling of the vehicle 1 in the L4_Lock mode when the failure that the electromagnetic valve SF1 is off occurs. With this configuration, it is possible to suppress deterioration of durability of the friction plates 304 caused by setting the L4_Lock mode when the failure that the electromagnetic valve SF1 is off occurs.

Second Embodiment

Next, the vehicle 1 provided with the drive device 10 according to a second embodiment will be described. In the description of the second embodiment, reference signs are assigned for the same configuration as that of the first embodiment, and the description thereof will be omitted as appropriate.

Figure 21:
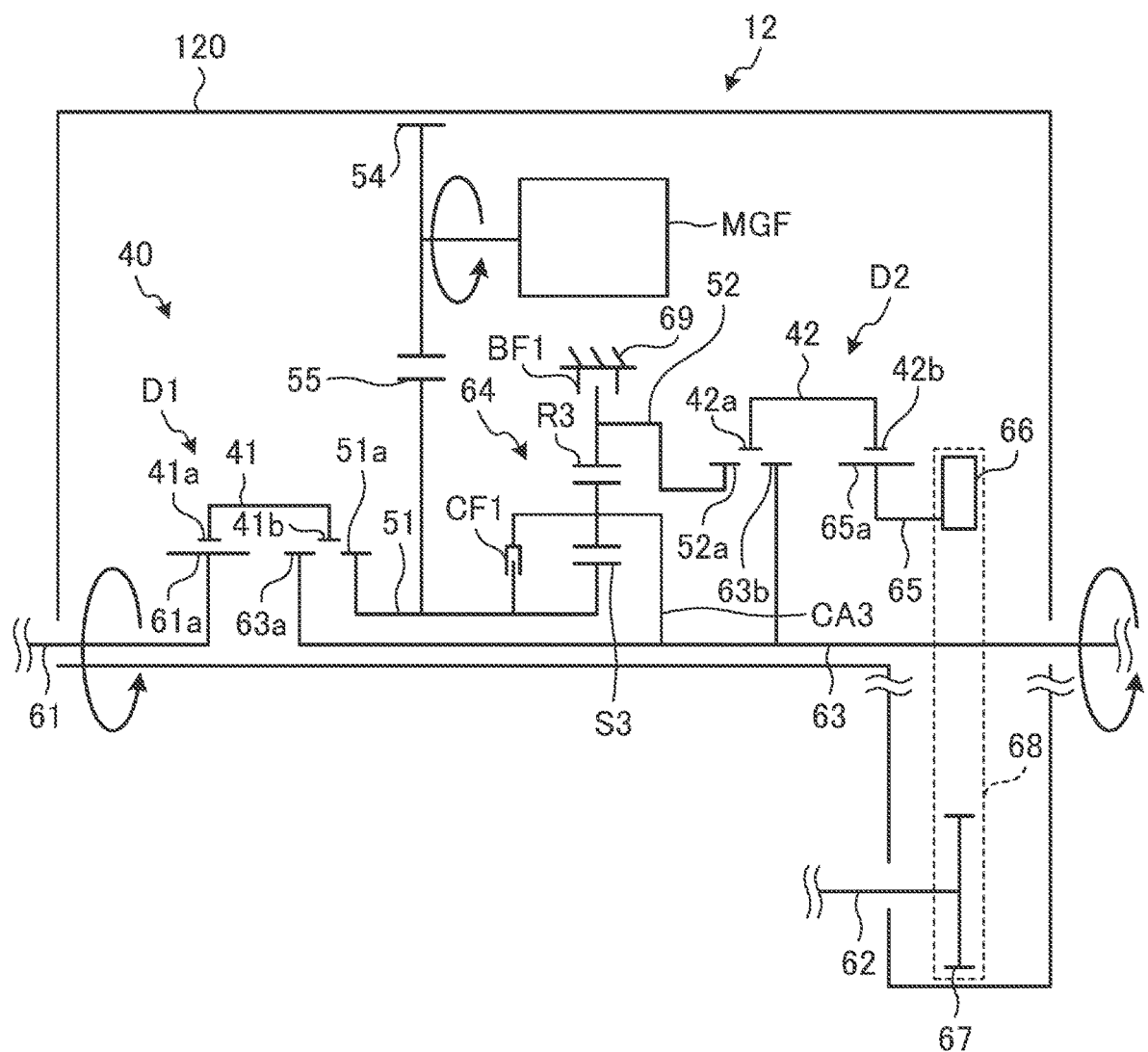
FIG. 21 is a skeleton diagram schematically showing the transfer according to a second embodiment, and is a skeleton diagram showing a case where the transfer is in the first drive state.

FIG. 21 is a skeleton diagram schematically showing the transfer 12 according to the second embodiment, and is a skeleton diagram showing a case where the transfer 12 is in the first drive state. In the transfer 12 according to the second embodiment, the carrier CA3 of the third planetary gear device 64 is constantly connected to the rear wheel side output shaft 63 so as to rotate integrally with the rear wheel side output shaft 63.

The transfer 12 includes the connection switching device 40 (first dog clutch D1 and second dog clutch D2), the brake BF1, and the clutch CF 1.

The transfer 12 according to the second embodiment includes the transfer member 65 that functions as an input rotating member of power to the front wheel 3 side as a rotating member that constitutes a power transfer path on the front wheel 3 side. The transfer member 65 is connected to the drive gear 66 so as to rotate integrally. The transfer member 65 is a rotating member that transfers power to the front wheel side output shaft 62. The transfer member 65 and the drive gear 66 are disposed so as to be rotatable relative to the rear wheel side output shaft 63. In the transfer 12 according to the second embodiment, the transfer member 65, the drive gear 66, and the third planetary gear device 64 are disposed on the same rotation center as the rear wheel side output shaft 63.

The second dog clutch D2 is a second disconnection-connection mechanism for switching the connection destination of the transfer member 65. The second dog clutch D2 can selectively connect the transfer member 65 to the rear wheel side output shaft 63 or the second rotating member 52 (ring gear R3).

The second dog clutch D2 includes a second switching sleeve 42 as a switching member. The second switching sleeve 42 includes the first gear teeth 42a that can mesh with the gear teeth 52a of the second rotating member 52 that rotates integrally with the ring gear R3 or the second gear teeth 63b of the rear wheel side output shaft 63. Further, the second switching sleeve 42 includes the second gear teeth 42b that constantly mesh with the gear teeth 65a of the transfer member 65. The second switching sleeve 42 is moved in the axial direction by the actuator of the second dog clutch D2. The second switching sleeve 42 is switched to any of a first transfer state in which the first gear teeth 42a mesh with the gear teeth 52a of the second rotating member 52 while the second gear teeth 42b constantly mesh with the gear teeth 65a of the transfer member 65, a disengaged state in which the first gear teeth 42a do not mesh with any of the gear teeth 52a of the second rotating member 52 and the second gear teeth 63b of the rear wheel side output shaft 63, and a second transfer state in which the first gear teeth 42a mesh with the second gear teeth 63b of the rear wheel side output shaft 63.

The brake BF1 selectively fixes the ring gear R3 of the third planetary gear device 64 to a fixing member 69. The transfer 12 is set to the high-speed side shift stage Hi when the brake BF1 is disengaged, and is set to the low-speed side shift stage Lo when the brake BF1 is engaged. The clutch CF1 selectively connects the sun gear S3 and the carrier CA3 of the third planetary gear device 64.

Figures 22, 23:
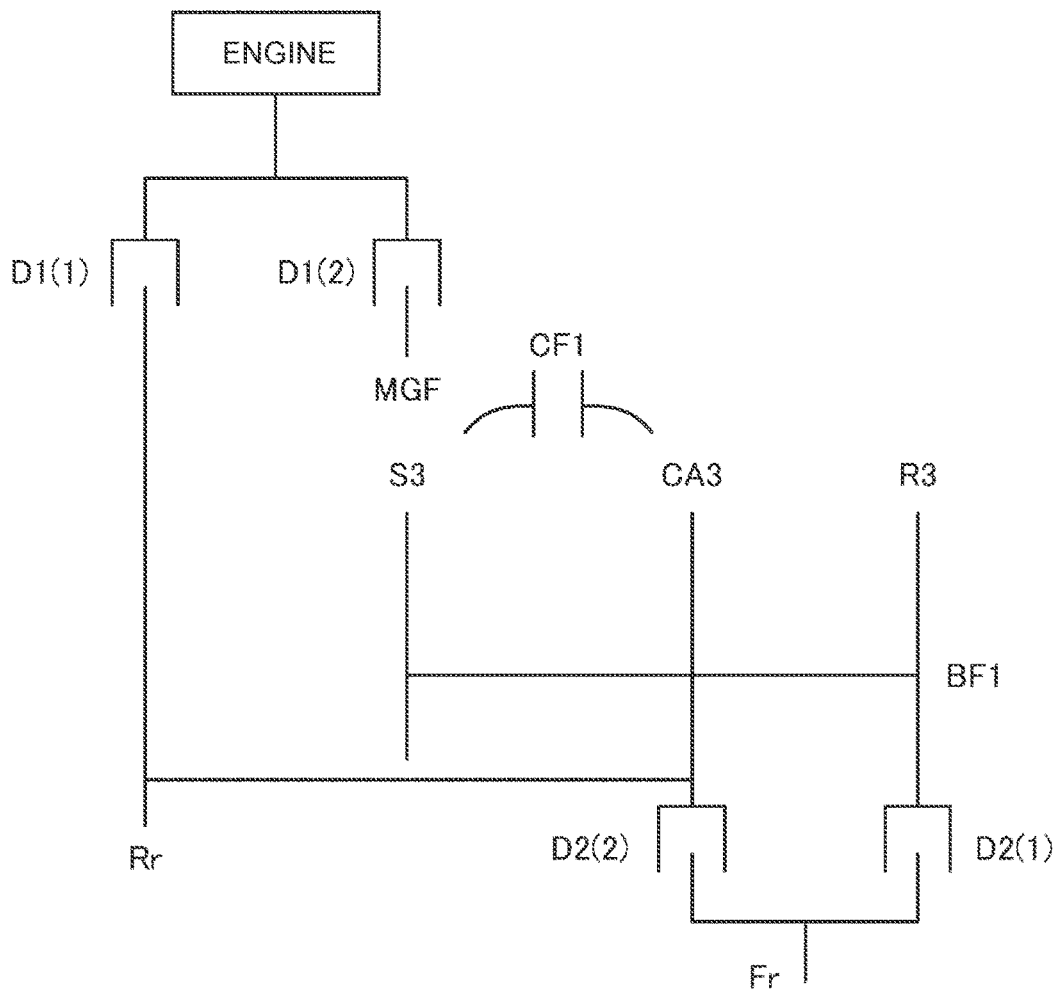
FIG. 22 is a diagram showing the engagement relationship of each rotating member in the transfer according to the second embodiment.
FIG. 23 is a diagram showing the relationship between each of the drive states of the transfer according to the second embodiment and an operating state of each engaging device.

FIG. 22 is a diagram showing the engagement relationship of each rotating member in the transfer 12 according to the second embodiment. The transfer 12 according to the second embodiment includes the rear wheel side output shaft 63, the front wheel side output shaft 62, and the third planetary gear device 64. The rear wheel side output shaft 63 is the first output shaft that is connected to the engine 2 (and the first rotating electric machine MG1 and the second rotating electric machine MG2) as the first power source and outputs power to the rear wheels 4 that are one of the front wheels 3 and the rear wheels 4. The front wheel side output shaft 62 is the second output shaft that outputs the power to the front wheels 3 that are the other of the front wheels 3 and the rear wheels 4. The third planetary gear device 64 is the differential mechanism including the sun gear S3 that is the first rotating element, the carrier CA3 that is the second rotating element, and the ring gear R3 that is the third rotating element. Further, the transfer 12 according to the second embodiment includes the brake BF1 that selectively fixes the ring gear R3 to the fixing member 69. Further, the transfer 12 according to the second embodiment is configured to input at least the power from the engine 2 that is the first power source to the sun gear S3, and fix the ring gear R3 to the fixing member 69 to decelerate the power input to the sun gear S3 and output the power from the carrier CA3 to the rear wheel side output shaft 63 and the front wheel side output shaft 62 such that the vehicle can travel in the four-wheel drive state. Further, the transfer 12 according to the second embodiment is configured to input the power from the third rotating electric machine MGF that is the second power source to the sun gear S3, and fix the ring gear R3 to the fixing member 69 to decelerate the power input to the sun gear S3 and output the power from the carrier CA3 to the rear wheel side output shaft 63 that is one of the first output shaft and the second output shaft such that the vehicle can travel in the two-wheel drive state.

FIG. 23 is a diagram showing the relationship between each of the drive states of the transfer 12 according to the second embodiment and an operating state of each engaging device. In FIG. 23, a white circle indicates engagement, a white triangle indicates engagement as needed, and blank indicates disengagement.

The first drive state shown in FIG. 21 is a drive state in the EV traveling mode in which the vehicle 1 travels using the power from the third rotating electric machine MGF in the EV(FR)_Hi mode, and also in the two-wheel drive state in which the power from the third rotating electric machine MGF is transferred only to the rear wheels 4. In the first drive state, the transfer 12 is set to a high-speed side shift stage Hi.

When the transfer 12 is in the first drive state, as shown in FIG. 23, the brake BF1 is disengaged, the clutch CF1 is engaged, the first dog clutch D1 is disengaged, and the second dog clutch D2 is disengaged. In the first drive state, the third planetary gear device 64 is in a direct connection state in which the sun gear S3 and the carrier CA3 are connected by the clutch CF1. In the first drive state, when the power from the third rotating electric machine MGF is transferred to the rear wheel side output shaft 63, the rotation of the third rotating electric machine MGF is transferred to the rear wheel side output shaft 63 without speed change by the third planetary gear device 64.

Figure 24:
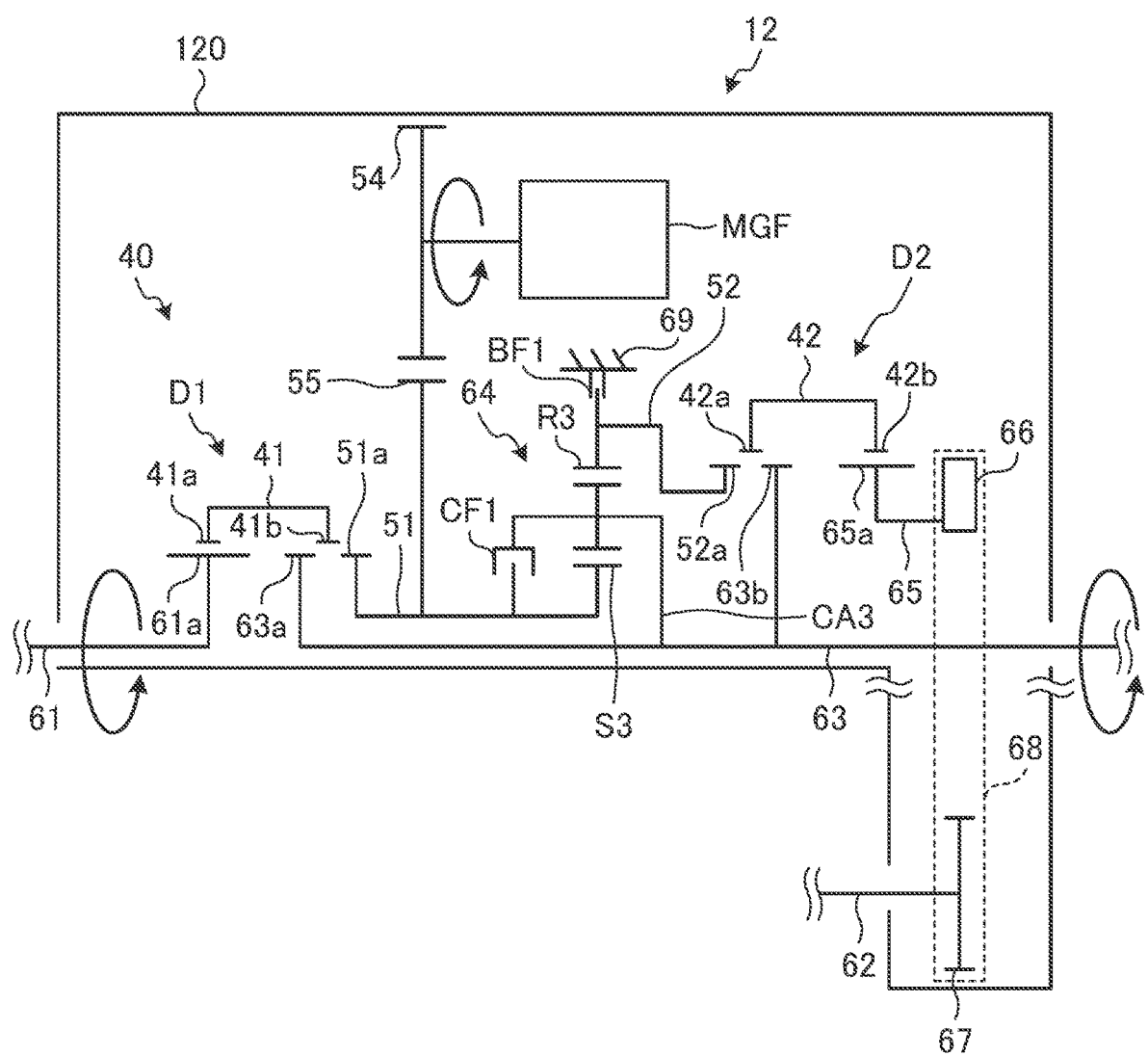
FIG. 24 is a skeleton diagram showing a case where the transfer according to the second embodiment is in the second drive state.

FIG. 24 is a skeleton diagram showing a case where the transfer 12 according to the second embodiment is in the second drive state. The second drive state is a drive state in the EV traveling mode in which the vehicle 1 travels using the power from the third rotating electric machine MGF in the EV(FR)_Lo mode, and also in the two-wheel drive state in which the power from the third rotating electric machine MGF is transferred only to the rear wheels 4. In the second drive state, the transfer 12 is set to a low-speed side shift stage Lo.

When the transfer 12 is in the second drive state, as shown in FIG. 23, the brake BF1 is engaged, the clutch CF1 is disengaged, the first dog clutch D1 is disengaged, and the second dog clutch D2 is disengaged. In the second drive state, the third planetary gear device 64 is in a speed reduction state in which the ring gear R3 is mechanically fixed to the fixing member 69 by the brake BF1. In the second drive state, the third rotating electric machine MGF is connected to the rear wheel side output shaft 63 on the power transfer path via the third planetary gear device 64 in the shifting state. Therefore, in the second drive state, the third rotating electric machine MGF is connected to the rear wheel side output shaft 63 on the power transfer path via the third planetary gear device 64 in the shifting state. Therefore, in the second drive state, when the power from the third rotating electric machine MGF is transferred to the rear wheel side output shaft 63, the rotation of the third rotating electric machine MGF is transferred to the rear wheel side output shaft 63 after speed reduction by the third planetary gear device 64.

Figure 25:
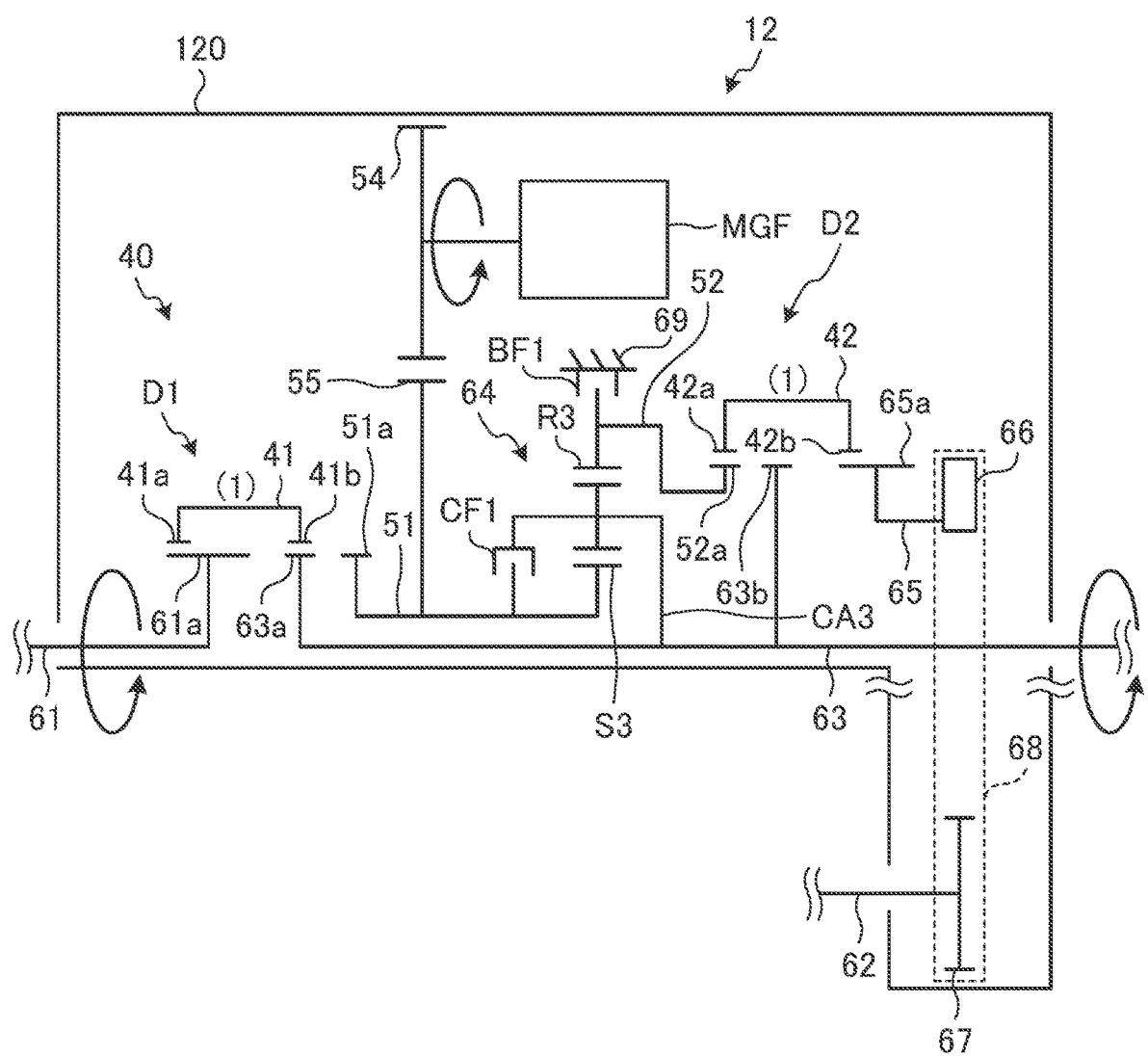
FIG. 25 is a skeleton diagram showing a case where the transfer according to the second embodiment is in the third drive state.

FIG. 25 is a skeleton diagram showing a case where the transfer 12 according to the second embodiment is in the third drive state. The third drive state is a drive state in a mode in which the power transferred to the transfer 12 in the H4 torque split mode is distributed to the front wheel 3 side and the rear wheel 4 side to cause the vehicle 1 to travel, and is also in the four-wheel drive state in which the power is transferred to the front wheels 3 and the rear wheels 4. In the third drive state, the torque distribution ratio at which the torque from the input shaft 61 is distributed to the front wheel side output shaft 62 and the rear wheel side output shaft 63 is changed with the MGF torque from the third rotating electric machine MGF. In other words, the sun gear S3 of the third planetary gear device 64 receives the torque transferred from the rear wheel side output shaft 63 to the ring gear R3 of the third planetary gear device 64 with the MGF torque from the third rotating electric machine MGF as a reaction force such that the torque transferred to the ring gear R3 is distributed to the front wheel 3 side and the rear wheel 4 side at an arbitrary ratio. In the third drive state, the transfer 12 is set to the high-speed side shift stage Hi.

When the transfer 12 is in the third drive state, as shown in FIG. 23, the brake BF1 is disengaged, the clutch CF1 is disengaged, the first dog clutch D1 is in the first input state, and the second dog clutch D2 is in the first transfer state. Note that, (1) in the first dog clutch D1 in FIG. 25 indicates that the first dog clutch D1 is in the first input state. Further, (1) in the second dog clutch D2 in FIG. 25 indicates that the second dog clutch D2 is in the first transfer state.

Figure 26:
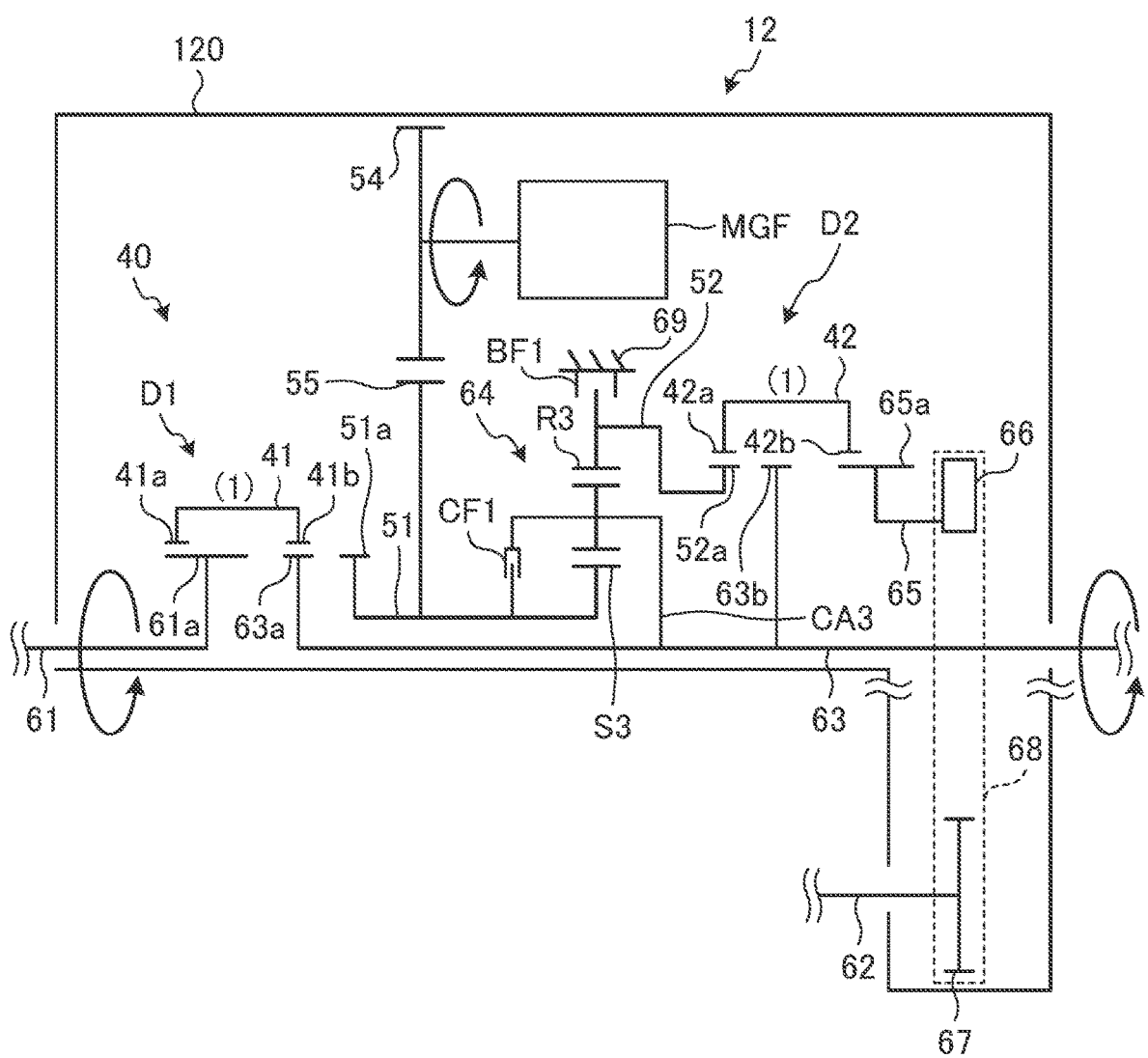
FIG. 26 is a skeleton diagram showing a case where the transfer according to the second embodiment is in the fourth drive state.

FIG. 26 is a skeleton diagram showing a case where the transfer 12 according to the second embodiment is in the fourth drive state. The fourth drive state is a drive state in a mode in which the power transferred to the transfer 12 in the H4_LSD mode is distributed to the front wheel 3 side and the rear wheel 4 side to cause the vehicle 1 to travel, and is also in the four-wheel drive state in which the power is transferred to the front wheels 3 and the rear wheels 4. The fourth drive state is a drive state in which the rotational differential between the front wheel side output shaft 62 and the rear wheel side output shaft 63 is restricted by the engagement control of the clutch CF1. In the fourth drive state, the torque distribution ratio at which the torque from the input shaft 61 is distributed to the front wheel side output shaft 62 and the rear wheel side output shaft 63 is changed by the engagement control of the clutch CF1. In the fourth drive state, the transfer 12 is set to the high-speed side shift stage Hi.

When the transfer 12 is in the fourth drive state, as shown in FIG. 23, the brake BF1 is disengaged, the clutch CF1 is under engagement control (half engaged), the first dog clutch D1 is in the first input state, and the second dog clutch D2 is in the first transfer state. Note that, (1) in the first dog clutch D1 in FIG. 26 indicates that the first dog clutch D1 is in the first input state. Further, (1) in the second dog clutch D2 in FIG. 26 indicates that the second dog clutch D2 is in the first transfer state.

Figure 27:
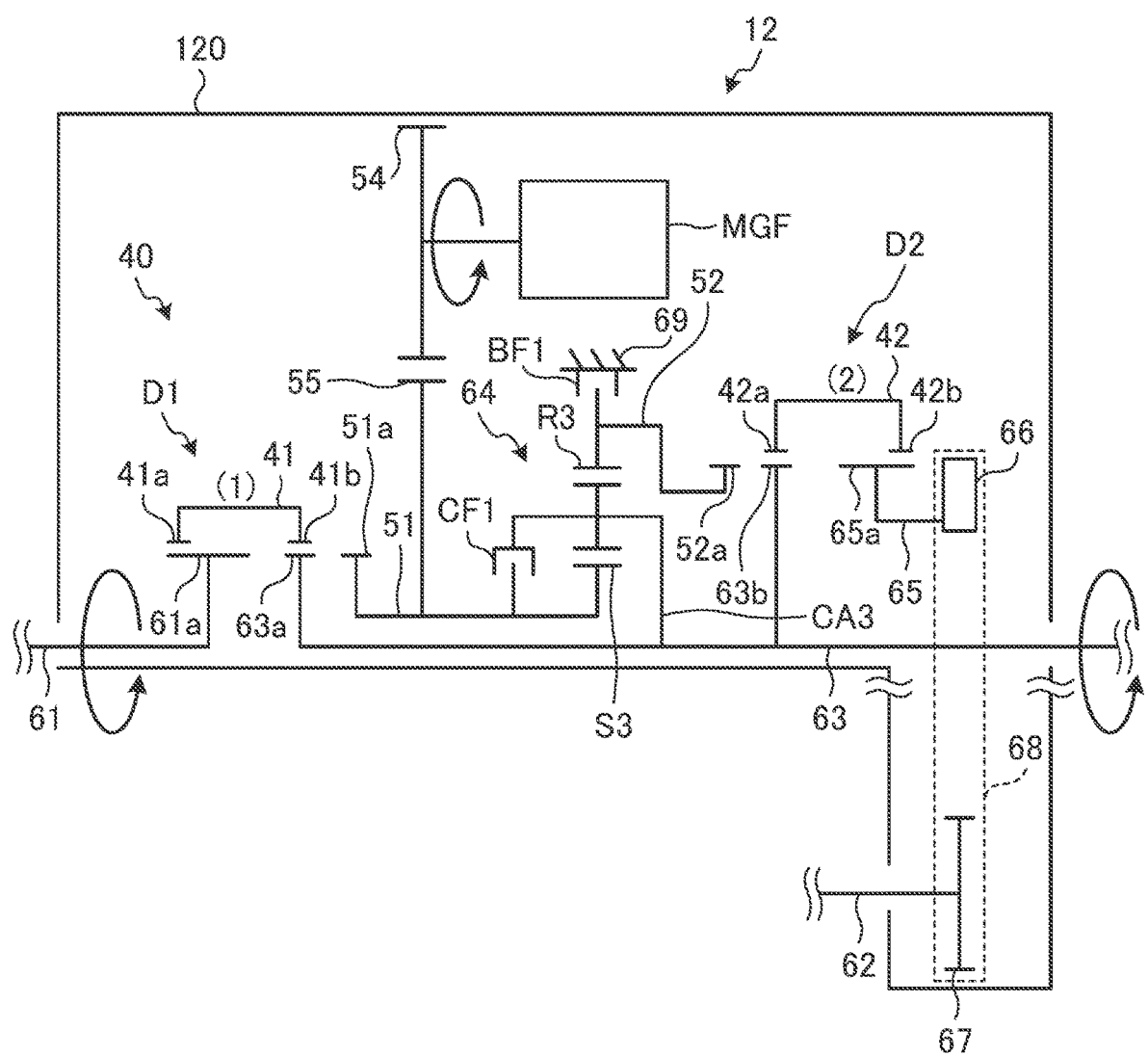
FIG. 27 is a skeleton diagram showing a case where the transfer according to the second embodiment is in the fifth drive state.

FIG. 27 is a skeleton diagram showing a case where the transfer 12 according to the second embodiment is in the fifth drive state. The fifth drive state is a drive state in a mode in which the power transferred to the transfer 12 in the H4_Lock mode (fixed distribution 4WD) is distributed to the front wheel 3 side and the rear wheel 4 side to cause the vehicle 1 to travel, and is also in a four-wheel drive state in which the power is transferred to the front wheels 3 and the rear wheels 4. The fifth drive state is a drive state in which the rotational differential between the front wheel side output shaft 62 and the rear wheel side output shaft 63 is disabled, and the torque distribution ratio at which the torque from the input shaft 61 is distributed to the front wheel side output shaft 62 and the rear wheel side output shaft 63 is fixed. Note that, in the fifth drive state, the transfer 12 is set to the high-speed side shift stage Hi.

When the transfer 12 is in the fifth drive state, as shown in FIG. 23, the brake BF1 is disengaged, the clutch CF1 is disengaged, the first dog clutch D1 is in the first input state (1), and the second dog clutch D2 is in the second transfer state. Note that, (1) in the first dog clutch D1 in FIG. 27 indicates that the first dog clutch D1 is in the first input state. Further, (2) in the second dog clutch D2 in FIG. 27 indicates that the second dog clutch D2 is in the second transfer state.

Figure 28:
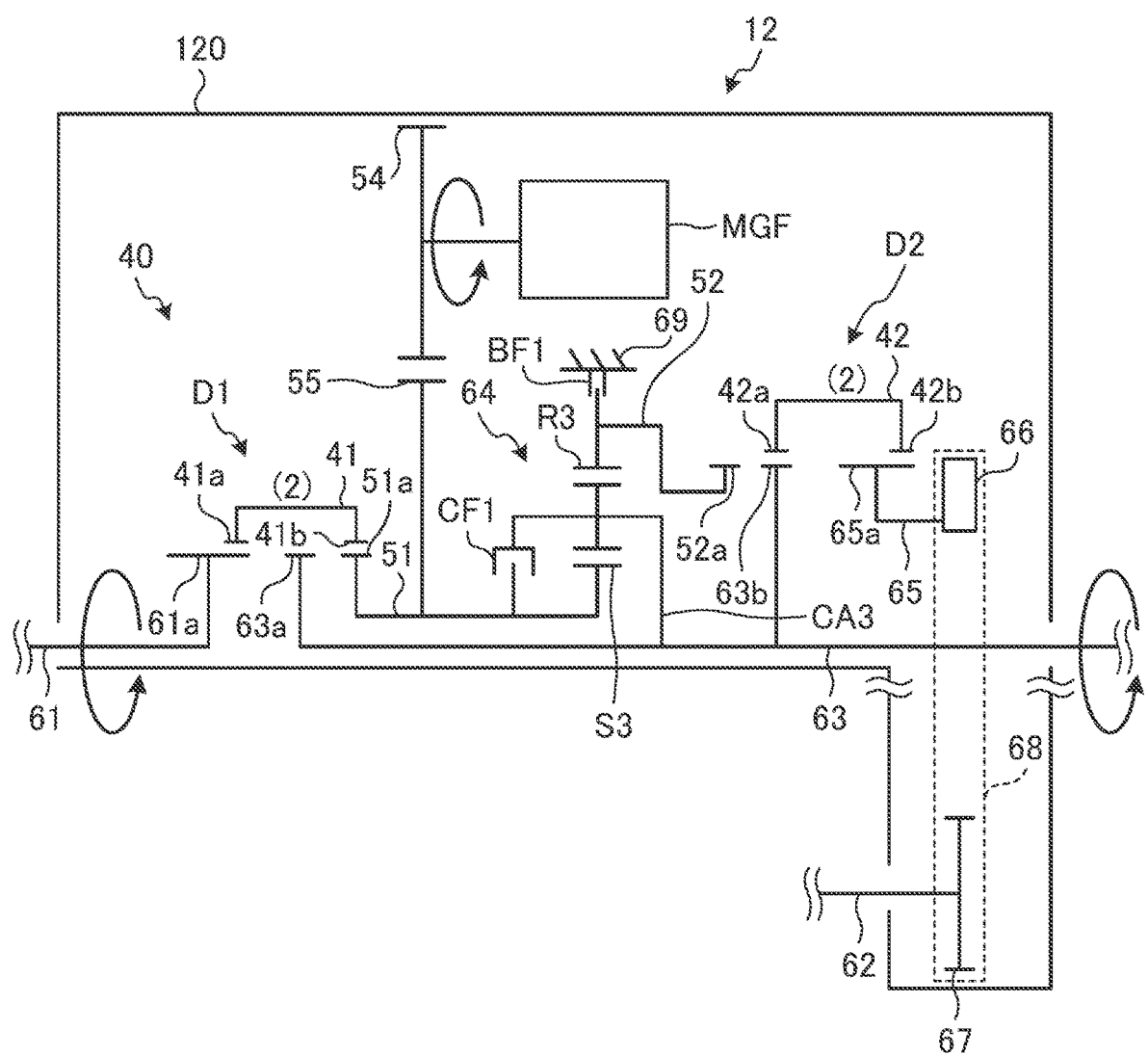
FIG. 28 is a skeleton diagram showing a case where the transfer according to the second embodiment is in the sixth drive state.

FIG. 28 is a skeleton diagram showing a case where the transfer 12 according to the second embodiment is in the sixth drive state. The sixth drive state is a drive state in a mode in which the power transferred to the transfer 12 in the L4 Lock mode (fixed distribution 4WD) is distributed to the front wheel 3 side and the rear wheel 4 side to cause the vehicle 1 to travel, and is also in the four-wheel drive state in which the power is transferred to the front wheels 3 and the rear wheels 4. The sixth drive state is a drive state in which the rotational differential between the front wheel side output shaft 62 and the rear wheel side output shaft 63 is disabled, and the torque distribution ratio at which the torque from the input shaft 61 is distributed to the front wheel side output shaft 62 and the rear wheel side output shaft 63 is fixed. In the sixth drive state, the transfer 12 is set to the low-speed side shift stage Lo.

When the transfer 12 is in the sixth drive state, as shown in FIG. 23, the brake BF1 is engaged, the clutch CF1 is disengaged, the first dog clutch D1 is in the second input state, and the second dog clutch D2 is in the second transfer state. Note that, (2) in the first dog clutch D1 in FIG. 28 indicates that the first dog clutch D1 is in the second input state. Further, (2) in the second dog clutch D2 in FIG. 28 indicates that the second dog clutch D2 is in the second transfer state.

In the transfer 12 according to the second embodiment, the L4_Lock mode can be set as the first traveling mode in which the power from the engine 2 is input to the sun gear S3 of the third planetary gear device 64, and the ring gear R3 of the third planetary gear device 64 is fixed to the fixing member 69 by the brake BF1 such that the power input to the sun gear S3 is decelerated and output from the carrier CA3 of the third planetary gear device 64 to the front wheel side output shaft 62 and the rear wheel side output shaft 63 to cause the vehicle 1 to travel in the four-wheel drive state.

Further, in the transfer 12 according to the second embodiment, the EV(FR)_Lo mode can be set as the second traveling mode in which the power from the third rotating electric machine MGF is input to the sun gear S3 of the third planetary gear device 64, and the third planetary gear device 64 is fixed to the fixing member 69 by the brake BF1 such that the power input to the sun gear S3 is decelerated and output from the carrier CA3 of the third planetary gear device 64 to the rear wheel side output shaft 63 to cause the vehicle 1 to travel in the two-wheel drive state.

Further, the drive device 10 according to the second embodiment has the configurations of the brake BF1 and the hydraulic control circuit 111 similar to the configurations described in the first embodiment with reference to the FIGS. 15, 16, 17, 19, 20, and the like.

Then, in the drive device 10 according to the second embodiment, various controls to be executed by the electronic control device 100 described in the first embodiment using FIG. 18 and the like can be implemented. At this time, the EV(FF)_Lo mode in the first embodiment may be replaced with the EV(FR)_Lo mode. For example, the drive device 10 according to the second embodiment controls the hydraulic control circuit 111 such that the hydraulic pressure Pbf1 is supplied to the first piston hydraulic chamber 311 and the second piston hydraulic chamber 312 when the L4_Lock mode is set, and controls the hydraulic control circuit 111 such that the hydraulic pressure Pbf1 is supplied only to the first piston hydraulic chamber 311 when the EV(FR)_Lo mode is set, similar to the configuration in the first embodiment described with reference to FIG. 18 and the like. With this configuration, it is possible to suppress the shock when the EV(FR)_Lo mode is set.

What is claimed is:

1. A vehicle drive device, comprising:
    a first power source;
    a second power source;
    a first output shaft that is connected to the first power source and outputs power to one of front wheels and rear wheels;
    a second output shaft that outputs power to the other of the front wheels and the rear wheels;
    a differential mechanism provided with a first rotating element, a second rotating element, and a third rotating element; and
    a control device;
    a brake that is provided with a plurality of friction plates, a first piston and a second piston that press the friction plates, and a first piston hydraulic chamber and a second piston hydraulic chamber for applying a hydraulic pressure to the first piston and the second piston, respectively, and selectively fixes the third rotating element to a fixing member; and
    a hydraulic control circuit that controls supply of the hydraulic pressure to the first piston hydraulic chamber and the second piston hydraulic chamber, wherein:
    a first traveling mode and a second traveling mode are configured to be settable, the first traveling mode being a mode in which at least the power from the first power source is input to the first rotating element and the third rotating element is fixed to the fixing member such that the power input to the first rotating element is decelerated and output from the second rotating element to the first output shaft and the second output shaft so as to cause a vehicle to travel in a four-wheel drive state, and the second traveling mode being a mode in which the power from the second power source is input to the first rotating element and the third rotating element is fixed to the fixing member such that the power input to the first rotating element is decelerated and output from the second rotating element to one of the first output shaft and the second output shaft so as to cause the vehicle to travel in a two-wheel drive state; and
    the control device is configured to
        control the hydraulic control circuit such that the hydraulic pressure is supplied to the first piston hydraulic chamber and the second piston hydraulic chamber when the first traveling mode is set, and
        control the hydraulic control circuit such that the hydraulic pressure is supplied only to one of the first piston hydraulic chamber and the second piston hydraulic chamber when the second traveling mode is set.

2. The vehicle drive device according to claim 1, wherein:
    the hydraulic control circuit includes
        a switching valve provided with a valve body of which position is switchable between a first position at which the hydraulic pressure is supplied to the first piston hydraulic chamber and the second piston hydraulic chamber and a second position at which the hydraulic pressure is supplied only to one of the first piston hydraulic chamber and the second piston hydraulic chamber, and
        an electromagnetic valve that switches the position of the valve body between the first position and the second position; and
    the position of the valve body is set to the first position when the electromagnetic valve is turned off.

3. The vehicle drive device according to claim 2, wherein the control device is configured to prohibit setting of the second traveling mode when a failure that the electromagnetic valve is off occurs.

4. The vehicle drive device according to claim 2, wherein the control device is configured to reduce the hydraulic pressure to be supplied to the first piston hydraulic chamber and the second piston hydraulic chamber for setting the second traveling mode when a failure that the electromagnetic valve is off occurs.

5. The vehicle drive device according to claim 1, wherein:
    the hydraulic control circuit includes
        a switching valve provided with a valve body of which position is switchable between a first position at which the hydraulic pressure is supplied to the first piston hydraulic chamber and the second piston hydraulic chamber and a second position at which the hydraulic pressure is supplied only to one of the first piston hydraulic chamber and the second piston hydraulic chamber, and
        an electromagnetic valve that switches the position of the valve body between the first position and the second position; and
    the position of the valve body is set to the second position when the electromagnetic valve is turned off.

6. The vehicle drive device according to claim 5, wherein the control device is configured to prohibit setting of the first traveling mode when a failure that the electromagnetic valve is off occurs.

7. The vehicle drive device according to claim 5, wherein the control device is configured to reduce torque output from the first power source for causing a vehicle to travel in the first traveling mode when a failure that the electromagnetic valve is off occurs.

* * * * *